United States Patent
Berstis et al.

(10) Patent No.: US 6,856,581 B1
(45) Date of Patent: Feb. 15, 2005

(54) BATTERYLESS, OSCILLATORLESS, BINARY TIME CELL USABLE AS AN HOROLOGICAL DEVICE WITH ASSOCIATED PROGRAMMING METHODS AND DEVICES

(75) Inventors: Viktors Berstis, Austin, TX (US); Peter Juergen Klim, Austin, TX (US); Chung Lam, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 09/703,344

(22) Filed: Oct. 31, 2000

(51) Int. Cl.[7] .................. G04F 10/00; G04C 19/00; G04C 15/00
(52) U.S. Cl. .................. 368/121; 368/86; 368/155
(58) Field of Search .................. 368/86–87, 89, 368/107–108, 121, 155

(56) References Cited

U.S. PATENT DOCUMENTS

| | | | | |
|---|---|---|---|---|
| 4,442,363 A | * | 4/1984 | Suzuki | 307/141.4 |
| 4,995,019 A | * | 2/1991 | Begin | 368/117 |
| 5,195,061 A | * | 3/1993 | Curtis | 368/9 |
| 5,323,066 A | * | 6/1994 | Feddeler et al. | 327/142 |
| 5,374,904 A | * | 12/1994 | Ishibashi | 331/17 |
| RE35,043 E | * | 9/1995 | Takeda | 368/205 |
| 5,500,834 A | * | 3/1996 | Sakaki et al. | 368/9 |
| 6,067,244 A | * | 5/2000 | Ma et al. | 365/145 |

OTHER PUBLICATIONS

B. Prince, *Semiconductor Memories: A Handbook of Design, Manufacture, and Application*, 2nd edition, John Wyley & Sons, pp. 182–187, Jul. 1996.

Weinberg, "On tunneling in metal–oxide–silicon structures", *J. Appl. Phys.*, v. 53, n. 7, pp. 5052–5056, Jul. 1982.

Amin, "Design, selection, and implementation of flash erase EEPROM memory cells", *IEE Proceeedings–G*, v. 139, n. 3, pp. 370–376, Jun. 1992.

Forbes, "Use of a spreadsheet for Fowler–Nordheim equation calculations", *J. Vac. Sci. Technol. B*, v. 17, n. 2, pp. 534–541, Mar./Apr. 1999.

(List continued on next page.)

*Primary Examiner*—Tulsidas Patel
*Assistant Examiner*—Michael L. Lindinger
(74) *Attorney, Agent, or Firm*—Jeffrey S. LaBaw; Joseph R. Burwell

(57) ABSTRACT

A simple electronic horological device, termed a time cell, is presented with associated methods, systems, and computer program products. A time cell has an insulated, charge storage element that receives an electrostatic charge through its insulating medium, i.e. it is programmed. Over time, the charge storage element then loses the charge through its insulating medium. Given the reduction of the electric potential of the programmed charge storage element at a substantially known discharge rate, and by observing the potential of the programmed charge storage element at a given point in time, an elapsed time period can be determined. Thus, the time cell measures an elapsed time period without a continuous power source. One type of time cell is an analog time cell that may have a form similar to a non-volatile memory cell, particularly a floating gate field effect transistor (FGFET). The time cell may have an expanded floating gate for storing an electrostatic charge. At a given point in time after programming the analog time cell, a sensing operation indirectly observes the retained charge in the floating gate by directly or indirectly observing the threshold voltage of the FGFET. By knowing the operational characteristics of the time cell and its initial programming condition, the observation can be converted into an elapsed time value. A time cell can be designed and/or programmed to select the range of time to be measured.

40 Claims, 26 Drawing Sheets

OTHER PUBLICATIONS

Lenzlinger et al., "Fowler–Nordheim Tunneling into Thermally Grown $SiO_2$", *J. Appl. Phys.*, v. 40, n. 1, pp. 278–283, Jan. 1969.

Masuoka et al., "Reviews and Prospects of Non–Volatile Semiconductor Memories", *IEICE Transactions*, v. E 74, n. 4, Apr. 1991.

Masuoka et al., "Flash Memories, Their Status and Trends", *Proceedings of 4th Intl. Conf. n Solid–State and Integrated Circuit Technology*, pp. 128–132, Oct. 1995.

Chi et al., "True Low–Voltage Flash Memory Operations", *Proceedings of 1996 Intl. Nonvolatil Memory Technology Conference*, pp. 94–98, Apr. 1996.

\* cited by examiner

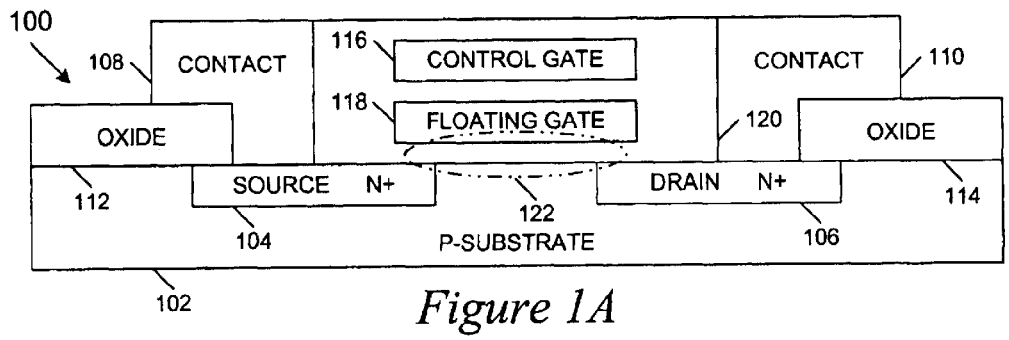
Figure 1A
*(PRIOR ART)*
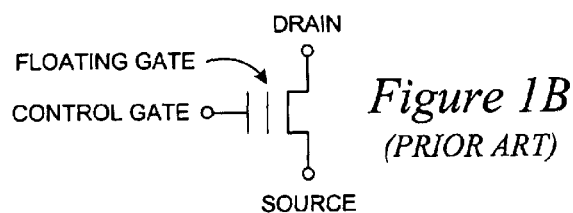
Figure 1B
*(PRIOR ART)*
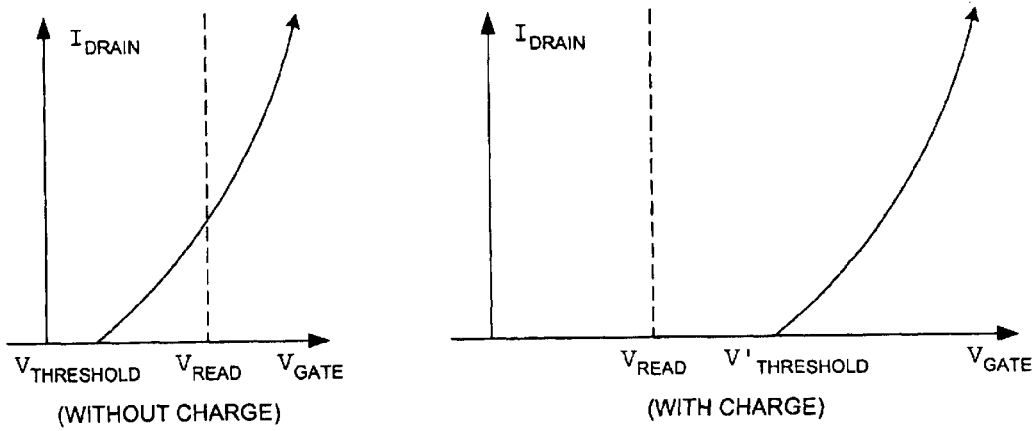
Figure 1C
*(PRIOR ART)*
Figure 1D
*(PRIOR ART)*

CALCULATION OF NV MEMORY CELL RETENTION CHARACTERISTICS

| q0, C | m0, kg | kb, J/K | h, J-s | hb, J-s | Seconds | Time Period |
|---|---|---|---|---|---|---|
| 1.6022E-019 | 9.1095E-031 | 1.38062E-023 | 6.62617E-034 | 1.05459E-034 | 31536000 | 1 year |
| | | | | | 94608000 | 3 years |
| | | | | | 1.9E+008 | 6 years |
| b0, eV (barrier) | εt | mr, effective mass ratio | | T, K degree | 2.8E+017 | 9 years |
| 2.9 | 3.9 | 0.5 | | 300 | 3.8E+008 | 12 years |
| | | | | | 4.7E+008 | 15 years |
| c | b | | | | 9.1E+009 | 18 years |
| 1.0630E-006 | 2.3854E+008 | | | | 6.6E+008 | 21 years |
| | | | | | 7.6E+008 | 24 years |
| | | | | | 8.5E+008 | 27 years |
| | | | | | 9.5E+008 | 30 years |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 80 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.4313 | Capacitance between the floating gate and the silicon substrate |
| Cfd fF | 0.1078 | Capacitance between the floating gate and the drain |
| Cfs fF | 0.7547 | Capacitance between the floating gate and the source |
| Cfg fF | 1090.8295 | Total floating gate capacitance |
| Cr,wl | 0.9988 | Control gate to floating gate coupling ratio |
| Cr,src | 0.0007 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg.ini | -5.00 | Initial floating chaged voltage |
| Va | 0.00 | Actual erase volatge (equal to applied + charge stored on the floating) |
| S | 3.76E+016 | Derived parameter in the floating gate "erase" equation |
| X | 1.27E+011 | Derived parameter in the floating gate "erase" equation |

*Figure 1E*
(PRIOR ART)

| t, sec. | Vt, fg |
|---|---|
| 0.00001 | 5.907 |
| 31536000 | 5.894 |
| 63072000 | 5.882 |
| 94608000 | 5.871 |
| 1.3E+008 | 5.861 |
| 1.6E+008 | 5.852 |
| 1.9E+008 | 5.843 |
| 2.2E+008 | 5.835 |
| 2.5E+008 | 5.827 |
| 2.8E+008 | 5.820 |
| 3.2E+008 | 5.814 |
| 3.5E+008 | 5.807 |
| 3.8E+008 | 5.801 |
| 4.1E+008 | 5.795 |
| 4.4E+008 | 5.790 |
| 4.7E+008 | 5.785 |
| 5E+008 | 5.780 |
| 5.4E+008 | 5.775 |
| 5.7E+008 | 5.770 |
| 6E+008 | 5.766 |
| 6.3E+008 | 5.762 |
| 6.6E+008 | 5.757 |
| 6.9E+008 | 5.753 |
| 7.3E+008 | 5.750 |
| 7.6E+008 | 5.746 |
| 7.9E+008 | 5.742 |
| 8.2E+008 | 5.739 |
| 8.5E+008 | 5.735 |
| 8.8E+008 | 5.732 |
| 9.1E+008 | 5.729 |
| 9.5E+008 | 5.726 |

CALCULATION OF NV MEMORY CELL RETENTION CHARACTERISTICS

| | | | | | Seconds | Time Period |
|---|---|---|---|---|---|---|
| q0, C | m0, kg | kb, J/K | h, J-s | hb, J-s | 60 | 1 minute |
| 1.6022E-019 | 9.1095E-031 | 1.38062E-023 | 6.62617E-034 | 1.05459E-034 | 3600 | 1 hour |
| | | | | | 86400 | 1 day |
| b0, eV (barrier) | εI | mr, effective mass ratio | | T, K degree | 604800 | 1 week |
| 2.9 | 3.9 | 0.5 | | 300 | 2592000 | 1 month |
| | | | | | 31536000 | 1 year |
| C | b | | | | 1.3E+008 | 4 years |
| 1.0630E-006 | 2.3854E+008 | | | | 5E+008 | 16 years |
| | | | | | 1E+009 | 32 years |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 80 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.4313 | Capacitance between the floating gate and the silicon substrate |
| Cfd fF | 0.1078 | Capacitance between the floating gate and the drain |
| Cfs fF | 0.7547 | Capacitance between the floating gate and the source |
| Cfg fF | 1090.8295 | Total floating gate capacitance |
| Cr,wl | 0.9988 | Control gate to floating gate coupling ratio |
| Cr,src | 0.0007 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg,ini | -5.00 | Initial floating chaged voltage |
| Va | 0.00 | Actual erase volatge (equal to applied + charge stored on the floating) |
| S | 3.76E+016 | Derived parameter in the floating gate "erase" equation |
| X | 1.27E+011 | Derived parameter in the floating gate "erase" equation |

*Figure 1G*
(PRIOR ART)

CALCULATION OF NV MEMORY CELL RETENTION CHARACTERISTICS

| | | | | | Seconds | Time Period |
|---|---|---|---|---|---|---|
| q0, C | m0, kg | kb, J/K | h, J-s | hb, J-s | 60 | 1 minute |
| 1.6022E-019 | 9.1095E-031 | 1.38062E-023 | 6.62617E-034 | 1.05459E-034 | 3600 | 1 hour |
| | | | | | 86400 | 1 day |
| b0, eV (barrier) | εI | mr, effective mass ratio | T, K degree | | 604800 | 1 week |
| 2.9 | 3.9 | 0.5 | 300 | | 2592000 | 1 month |
| | | | | | 31536000 | 1 year |
| c | b | | | | 1.3E+008 | 4 years |
| 1.0630E-006 | 2.3854E+008 | | | | 5E+008 | 16 years |
| | | | | | 1E+009 | 32 years |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 85 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.4059 | Capacitance between the floating gate and the silicon substrate |
| Cfd fF | 0.1015 | Capacitance between the floating gate and the drain |
| Cfs fF | 0.7103 | Capacitance between the floating gate and the source |
| Cfg fF | 1090.7534 | Total floating gate capacitance |
| Cr,wl | 0.9989 | Control gate to floating gate coupling ratio |
| Cr,src | 0.0007 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg,ini | -5.00 | Initial floating chaged voltage |
| Va | 0.00 | Actual erase volatge (equal to applied + charge stored on the floating) |
| S | 4.09E+017 | Derived parameter in the floating gate "erase" equation |
| X | 1.20E+011 | Derived parameter in the floating gate "erase" equation |

*Figure 1I*

(PRIOR ART)

CALCULATION OF NV MEMORY CELL RETENTION CHARACTERISTICS

| | | | | | Seconds | Time Period |
|---|---|---|---|---|---|---|
| q0, C | m0, kg | kb, J/K | h, J-s | hb, J-s | 2592000 | 1 month |
| 1.6022E-019 | 9.1095E-031 | 1.38062E-023 | 6.62617E-034 | 1.05459E-034 | 5184000 | 2 months |
| | | | | | 7776000 | 3 months |
| b0, eV (barrier) | c1 | mr, effective mass ratio | T, K degree | | 10368000 | 4 months |
| 2.9 | 3.9 | 0.5 | 300 | | 12960000 | 5 months |
| | | | | | 15552000 | 6 months |
| c | b | | | | 18144000 | 7 months |
| 1.0630E-006 | 2.3854E+008 | | | | 20736000 | 8 months |
| | | | | | 23328000 | 9 months |
| | | | | | 25920000 | 10 months |
| | | | | | 28512000 | 11 months |
| | | | | | 31104000 | 12 months |

| | | | |
|---|---|---|---|
| Lfg um | 0.6000 | Channel length of floating gate device | 33696000 / 13 months |
| Wfg um | 1000.0000 | Channel width of floating gate device. | 36288000 / 14 months |
| Hfg um | 0.0900 | Thickness of floating gate polysilicon conductor | 38880000 / 15 months |
| Wrx um | 0.5000 | Width of floating gate overlapping shallow trench isolation | 41472000 / 16 months |
| Ttunox A | 65 | Tunnel oxide thickness | |
| Tono A | 190 | Thickness of Oxide-Nitride-Oxide dielectric between floating gate and control gate for capacitive coupling | |
| Tswox A | 300 | Thickness of sidewall oxide between floating gate and control gate for sidewall coupling | |
| Xfd um | 0.0500 | Length of floating gate overlapping drain region of the floating gate MOSFET | |
| Xfs um | 0.3500 | Length of floating gate overlapping source region of the floating gate MOSFET | |
| Ainj um2 | 0.0438 | Area of the electron tunneling region between the floating gate and the source for resetting the floating gate charge | |
| Cfc fF | 1089.5358 | Capacitance between the floating gate and the control gate | |
| Cfsx fF | 0.5308 | Capacitance between the floating gate and the silicon substrate | |
| Cfd fF | 0.1327 | Capacitance between the floating gate and the drain | |
| Cfs fF | 0.9288 | Capacitance between the floating gate and the source | |
| Cfg fF | 1091.1281 | Total floating gate capacitance | |
| Cr,wl | 0.9985 | Control gate to floating gate coupling ratio | |
| Cr,src | 0.0009 | Source junction to floating gate coupling ratio | |
| Vt,fg V | 0.90 | Threshold voltage of floating gate MOSFET | |
| Verase | 0.00 | Erase voltage applied to the source(not used here, set to zero) | |
| Vfg,ini | -5.00 | Initial floating chaged voltage | |
| Va | 0.00 | Actual erase volatge (equal to applied + charge stored on the floating) | |
| S | 2.93E+013 | Derived parameter in the floating gate "erase" equation | |
| X | 1.56E+011 | Derived parameter in the floating gate "erase" equation | |

*Figure 1L*

CALCULATION OF NV MEMORY CELL RETENTION CHARACTERISTICS

|  |  |  |  |  | Seconds | Time Period |
|---|---|---|---|---|---|---|
| q0, C | m0, kg | kb, J/K | h, J-s | hb, J-s | 60 | 1 minute |
| 1.6022E-019 | 9.1095E-031 | 1.38062E-023 | 6.62617E-034 | 1.05459E-034 | 3600 | 1 hour |
|  |  |  |  |  | 86400 | 1 day |
| b0, eV (barrier) | εI | mr, effective mass ratio |  | T, K degree | 604800 | 1 week |
| 2.9 | 3.9 | 0.5 |  | 300 | 1209600 | 2 weeks |
|  |  |  |  |  | 2592000 | 1 month |
| c | b |  |  |  | 5184000 | 2 months |
| 1.0630E-006 | 2.3854E+008 |  |  |  | 10368000 | 4 months |
|  |  |  |  |  | 15552000 | 6 months |
|  |  |  |  |  | 20736000 | 8 months |
|  |  |  |  |  | 25920000 | 10 months |
|  |  |  |  |  | 31104000 | 12 months |
| Lfg um | 0.6000 | Channel length of floating gate device |  |  | 36288000 | 14 months |
| Wfg um | 1000.0000 | Channel width of floating gate device. |  |  | 41472000 | 16 months |
| Hfg um | 0.0900 | Thickness of floating gate polysilicon conductor |  |  |  |  |
| Wrx um | 0.5000 | Width of floating gate overlapping shallow trench isolation |  |  |  |  |
| Ttunox A | 65 | Tunnel oxide thickness |  |  |  |  |
| Tono A | 190 | Thickness of Oxide-Nitride-Oxide dielectric between floating gate and control gate for capacitive coupling |  |  |  |  |
| Tswox A | 300 | Thickness of sidewall oxide between floating gate and control gate for sidewall coupling |  |  |  |  |
| Xfd um | 0.0500 | Length of floating gate overlapping drain region of the floating gate MOSFET |  |  |  |  |
| Xfs um | 0.3500 | Length of floating gate overlapping source region of the floating gate MOSFET |  |  |  |  |
| Ainj um2 | 0.0438 | Area of the electron tunneling region between the floating gate and the source for resetting the floating gate charge |  |  |  |  |
| Cfc fF | 1089.5358 | Capacitance between the floating gate and the control gate |  |  |  |  |
| Cfsx fF | 0.5308 | Capacitance between the floating gate and the silicon substrate |  |  |  |  |
| Cfd fF | 0.1327 | Capacitance between the floating gate and the drain |  |  |  |  |
| Cfs fF | 0.9288 | Capacitance between the floating gate and the source |  |  |  |  |
| Cfg fF | 1091.1281 | Total floating gate capacitance |  |  |  |  |
| Cr,wl | 0.9985 | Control gate to floating gate coupling ratio |  |  |  |  |
| Cr,src | 0.0009 | Source junction to floating gate coupling ratio |  |  |  |  |
| Vt,fg V | 0.90 | Threshold voltage of floating gate MOSFET |  |  |  |  |
| Verase | 0.00 | Erase voltage applied to the source(not used here, set to zero) |  |  |  |  |
| Vfg,ini | -5.00 | Initial floating chaged voltage |  |  |  |  |
| Va | 0.00 | Actual erase volatge (equal to applied + charge stored on the floating) |  |  |  |  |
| S | 2.93E+013 | Derived parameter in the floating gate "erase" equation |  |  |  |  |
| X | 1.56E+011 | Derived parameter in the floating gate "erase" equation |  |  |  |  |

*Figure 1N*

CALCULATION OF NV MEMORY CELL RETENTION CHARACTERISTICS

| | | | | | Seconds | Time Period |
|---|---|---|---|---|---|---|
| q0, C | m0, kg | kb, J/K | h, J-s | hb, J-s | 60 | 1 minute |
| 1.6022E-019 | 9.1095E-031 | 1.38062E-023 | 6.62617E-034 | 1.05459E-034 | 3600 | 1 hour |
| | | | | | 86400 | 1 day |
| b0, eV (barrier) | εl | mr, effective mass ratio | T, K degree | | 604800 | 1 week |
| 2.9 | 3.9 | 0.5 | 300 | | 1209600 | 2 weeks |
| | | | | | 2592000 | 1 month |
| c | b | | | | 5184000 | 2 months |
| 1.0630E-006 | 2.3854E+008 | | | | 10368000 | 4 months |
| | | | | | 15552000 | 6 months |
| | | | | | 20736000 | 8 months |
| | | | | | 25920000 | 10 months |
| | | | | | 31104000 | 12 months |
| | | | | | 36288000 | 14 months |
| | | | | | 41472000 | 16 months |

| | | |
|---|---|---|
| Lfg um | 0.6000 | Channel length of floating gate device |
| Wfg um | 1000.0000 | Channel width of floating gate device. |
| Hfg um | 0.0900 | Thickness of floating gate polysilicon conductor |
| Wrx um | 0.5000 | Width of floating gate overlapping shallow trench isolation |
| Ttunox A | 60 | Tunnel oxide thickness |
| Tono A | 190 | Thickness of Oxide-Nitride-Oxide dielectric between floating gate and control gate for capacitive coupling |
| Tswox A | 300 | Thickness of sidewall oxide between floating gate and control gate for sidewall coupling |
| Xfd um | 0.0500 | Length of floating gate overlapping drain region of the floating gate MOSFET |
| Xfs um | 0.3500 | Length of floating gate overlapping source region of the floating gate MOSFET |
| Ainj um2 | 0.0438 | Area of the electron tunneling region between the floating gate and the source for resetting the floating gate charge |
| Cfc fF | 1089.5358 | Capacitance between the floating gate and the control gate |
| Cfsx fF | 0.5750 | Capacitance between the floating gate and the silicon substrate |
| Cfd fF | 0.1438 | Capacitance between the floating gate and the drain |
| Cfs fF | 1.0063 | Capacitance between the floating gate and the source |
| Cfg fF | 1091.2608 | Total floating gate capacitance |
| Cr,wl | 0.9984 | Control gate to floating gate coupling ratio |
| Cr,src | 0.0009 | Source junction to floating gate coupling ratio |
| Vt,fg V | 0.90 | Threshold voltage of floating gate MOSFET |
| Verase | 0.00 | Erase voltage applied to the source(not used here, set to zero) |
| Vfg,ini | -5.00 | Initial floating chaged voltage |
| Va | 0.00 | Actual erase volatge (equal to applied + charge stored on the floating) |
| S | 2.70E+012 | Derived parameter in the floating gate "erase" equation |
| X | 1.69E+011 | Derived parameter in the floating gate "erase" equation |

*Figure 1P*

VOLTAGES DURING PROGRAMMING OPERATION

VOLTAGES DURING SENSING OPERATION

BATTERYLESS, OSCILLATORLESS, BINARY TIME CELL USABLE AS AN HOROLOGICAL DEVICE WITH ASSOCIATED PROGRAMMING METHODS AND DEVICES

CROSS-REFERENCE TO RELATED APPLICATIONS

The present application is related to the following applications: application Ser. No. 09/703,344, filed Oct. 31, 2000, titled "Batteryless, Oscillatorless, Binary Time Cell Usable as an Horological Device with Associated Programming Methods and Devices"; application Ser. No. 09/703,335, filed Oct. 31, 2000, titled "Batteryless, Oscillatorless, Analog Time Cell Usable as an Horological. Device with Associated Programming Methods and Devices"; application Ser. No. 09/703,340, filed Oct. 31, 2000, titled "Sensing Methods and Devices for a Batteryless, Oscillatorless, Binary Time Cell Usable as an Horological Device".

BACKGROUND OF THE INVENTION

1. Field of the Invention

The present invention relates to horology and, in particular, to methods and devices for time measurement using an electrical time base. Still more particularly, the present invention provides a device, which may be a solid-state device, with methods and systems pertaining thereto, for measuring time without an oscillator, oscillating element, or oscillating circuit and without a continuous power source.

2. Description of Related Art

Portable electronic devices have become ubiquitous, and as the size and cost of electronic circuits continues to be reduced, electronic devices continue to be incorporated in an increasing number of consumer products. As an example, paper greeting cards that play music when opened are no longer considered a novelty. Technical progress has been made on flexible circuits that will allow electronic circuits to created in a variety of shapes and to be embedded into more products.

Inexpensive electronic devices can be categorized based upon their power requirements or associated power systems. Some electronic devices have a variety of functions that may require the device to be powered by an external power source, such as an electrical outlet via an AC-DC adapter, while some devices require one or more batteries. Other devices may require both types of power sources: an external power source for enabling most functions, and a small battery for powering minor functions, such as a clock or timekeeping function, while not connected to an external power source or while "turned off". Small electronic devices frequently incorporate a small, flat battery, similar to those that power electronic watches, merely to power a clock circuit. Generally, the battery powers some type of time base oscillator or pulse generator that measures the passage of units of time.

The incorporation of a battery into an electronic device solely for a simple clock function creates several disadvantages. Chemical batteries present potential chemical leak and disposal hazards and are relatively expensive compared to the cost of fabricating a tiny electronic circuit. Batteries tend to have a short shelf life, especially compared to the useful life of the electronic circuits that they accompany. In addition, batteries are sometimes several times larger than the electronic circuit to which they are connected, thereby placing design restrictions on the electronic device.

Electronic time base oscillators are assumed to be necessary for small, electronic, horological devices, but the accompanying batteries have many inherent disadvantages. Hence, the current state of technology constrains the conception of other devices, consumer products, or consumer services that might incorporate a time measurement function.

Therefore, it would be advantageous to provide a tiny, simple, electronic, horological device that provides time measurement without a battery or an oscillator.

SUMMARY OF THE INVENTION

A simple electronic horological device, termed a time cell, is presented in addition to associated methods, systems, devices, and computer program products. The claims of the present application are mostly directed to a particular type of time cell and the devices and their associated methods that may be used to read the time cell, thereby generating a time measurement that may be used for a temporally dependent purpose.

A time cell includes an insulated, charge storage element that receives an electrostatic charge through its insulating medium, i.e. it is programmed, thereby giving the charge storage element an electric potential with respect to points outside the insulating medium. Over time, the charge storage element then loses the electrostatic charge through the insulating medium. Given the reduction of the electric potential of the programmed charge storage element at a substantially known discharge rate, and by observing the electric potential of the programmed charge storage element at a given point in time, an elapsed time period can be determined. Thus, the time cell is able to measure an elapsed time period without a continuous power source.

One type of time cell is an analog time cell that may have a form similar to a non-volatile memory cell, such as a floating gate field effect transistor (FGFET). The analog time cell may have an expanded floating gate for storing an electrostatic charge. At a given point in time after programming the analog time cell, a sensing operation indirectly observes the retained charge in the floating gate by directly or indirectly observing the threshold voltage of the FGFET. By knowing the operational characteristics of the analog time cell and its initial programming condition, the observation can be converted into an elapsed time value. A time cell can be designed and/or programmed to select the range of time to be measured by the time cell.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 1A depicts a typical non-volatile memory cell containing a charge storage element implemented as a typical floating gate field effect transistor;

FIG. 1B depicts a symbolic representation for an FGFET;

FIGS. 1C–1D depict the effect upon the threshold voltage by a programmed floating gate of an n-type floating gate field effect transistor;

FIGS. 1E–1J are spreadsheet models and graphs that depict the threshold voltage retention characteristics over long periods of time for non-volatile memory cells which have traditional dimensions and geometries;

FIGS. 1L–1Q are spreadsheet models and graphs that depict the threshold voltage retention characteristics of an n-type floating gate field effect transistor in a time cell in which the tunnel oxide has been thinned;

DETAILED DESCRIPTION OF THE INVENTION

Figure 1F:
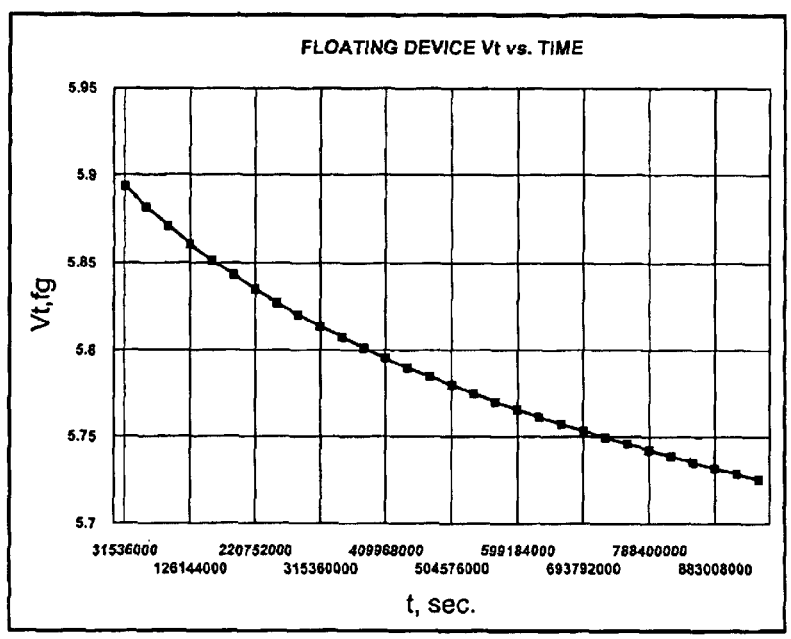

Introduction to Basic Device of Present Invention

The present invention is directed to a simple, electronic, horological device. In general, an insulated, charge storage element receives an amount of electrostatic charge through its insulating medium, i.e. the charge storage element is "programmed", thereby giving the charge storage element a known electric potential with respect to points outside the insulating medium.

Over a period of time, the charge storage element then loses, discharges, emits, or leaks the electrostatic charge through its insulating medium through some type of physical process, thereby reducing the electric potential of the charge storage element. In other words, the electric potential of the programmed charge storage element is reduced at a substantially known rate through a transport or emission process in which electrostatic charge is removed from the charge storage element. The discharge rate may or may not be linear, although a discharge function that models the discharge process of the charge storage element is substantially known.

At a given point in time, the electric potential of the charge storage element is observed. By knowing the beginning electric potential of the charge storage element, the observed electric potential at the given time, and the charge discharge rate of the charge storage element, an elapsed time period can be determined for a given point in time.

The programming process and the discharge process of the charge storage element may be selectively controlled by varying the geometry, materials, and/or physical construction of the charge storage element. Since the programming process may be a quicker, less precise process than the discharging process, the charge storage element may be designed with a higher priority to controlling the discharging process. In other words, the horological device may be engineered within certain parameters to achieve desired temporal properties for a mathematical discharge function that models the physical discharging process, as is discussed with respect to the embodiments of the invention that are presented below in more detail. For instance, it is desirable that the period of time during which a programmed charge storage element discharges should be substantially longer than the period of time required to program the charge storage element.

The charge storage element comprises its insulating medium and its internal medium. Although an insulating medium exhibits relatively poor conduction of electric charge, charge may pass through an insulating medium depending upon certain factors, such as the dielectric constant of the insulating medium (its resistivity) and the width of the insulating medium between the source of the charge and the destination of the charge. Typically, an insulating medium has a higher electrical resistance than adjacent media and generally serves to separate and to isolate adjacent conductors or semiconductors. In the present invention, the insulating medium of the charge storage element substantially surrounds and contains an internal medium capable of bearing an electrostatic charge, i.e. the internal medium cannot be comprised solely of free space. The insulating medium may comprise free space, a gaseous medium, a liquid, a solid, or a combination of these. Although the insulating media substantially surrounds the internal medium, the internal medium does not necessarily occupy the entire space enclosed by the insulating media.

Although the charge storage element is substantially electrically isolated by its insulating medium, the charge storage element may be programmed through its insulating medium in a relatively short period of time using a variety of known physical processes. In general, an insulating material, such as silicon dioxide (glass), is a substance whose conduction band is separated from the valence band by such a large band gap that hardly any electrons can acquire sufficient energy to be lifted into the conduction band. However, certain physical processes may cause very limited transport of electrons through an insulating material. The physical processes by which the internal medium receives or discharges an electrostatic charge through the insulating medium will vary depending upon implementation of the charge storage element, which should be apparent as the various embodiments of the invention are presented below in more detail.

Accuracy of Basic Device of the Present Invention

The accuracy of the horological device of the present invention is inherently limited. However, the accuracy of any actual horological device is limited by the precision of its construction. Moreover, any finely constructed instrument for measuring time is inherently limited by the physical processes of the interacting objects that are being used as a standard unit of time or as the standard of temporal measurement. For example, a wristwatch that operates by winding a spring cannot be constructed so that it is as precise at measuring fractions of a second as an atomic clock that operates by monitoring the vibrations of a cesium atom.

With the present invention, the accuracy of the horological device is inherently limited by the accuracy to which one can model the discharge process with a discharge function for an actual physical device and the accuracy to which one observes the retained electrostatic charge. For example, a programmed charge storage element may exhibit a non-linear discharge process in which its electric potential asymptotically approaches a value. In that case, the temporal accuracy of successive observations tends to decrease over the lifetime of the electrostatic charge, thereby limiting the purposes for which the present invention may be useful. However, the diminishing accuracy may or may not be a disadvantage, depending upon the particular purpose for which one might use the present invention.

The use of any instrument represents an antecedent choice between the desired accuracy of the instrument's measurements and the cost, effort, or importance of the measurements. For example, one does not expend the cost and effort to maintain an atomic clock as a time reference for normal daily actions for which a wristwatch is better suited. From a different perspective, though, one might say that a decent wristwatch and an atomic clock were equally suited to the task of determining a time period of one year to an accuracy of one minute. Similarly, in determining whether the present invention would prove useful for a particular purpose, the accuracy and the operational characteristics of the horological device of the present invention should be suited to the particular purpose.

The accuracy and operational characteristics will vary according to the embodiment of the present invention. The inherent tradeoffs between accuracy and utility should be apparent as the various embodiments of the invention are presented below in more detail.

Analogies between an Hourglass and Present Invention

In order to provide an expanded understanding of the present invention, analogies can be made between the present invention and an hourglass. An hourglass is a timekeeping device of ancient origin consisting of a timekeeping container and a timekeeping substance. The timekeeping container is usually two clear, counterposed, flasks or flask-like containers that have their narrow or open ends joined to form a small aperture. The container is usually supported by a metal or wooden frame or stand. One half of the container holds, or is almost filled, with a fluid or granular substance that acts as the timekeeping substance. Most commonly, the container is made of glass, and the timekeeping substance is sand. Inverting the hourglass imparts gravitational potential energy to the timekeeping substance, which causes the enclosed substance to flow from the upper half to the lower half of the container over a period of time.

Hourglasses, also called sand timers, may measure a period of one hour, but the term is used for any such gravitational device. The hourglass's measured time period is set by the amount of timekeeping substance and the size of the container's aperture. A larger amount of timekeeping substance and a smaller aperture extends the measured time period, although the aperture can be so narrow that the timekeeping substance does not flow regularly or does not flow at all. To an extent, the characteristics of the timekeeping substance affect the characteristics of the flow of the substance through the aperture. For example, large sand grains may flow through the aperture more slowly than fine sand grains.

The container's transparency allows someone to observe the amount of timekeeping substance retained in the upper half of the container (or the lower half), thereby providing an indication of the amount of time that has passed since the hourglass was inverted. The hourglass may be marked to denote smaller periods of time such that when the surface of the timekeeping substance falls to the mark, a predetermined period of time has passed.

The horological device of the present invention could be termed an "electrostatic hourglass" as it is analogous to an hourglass in the following manners. The insulating medium of the charge storage element is analogous to the glass container of an hourglass, and the internal medium of the charge storage element is similar to the free space within the glass container. In the case in which the timekeeping substance in an hourglass comprises sand grains, individual charge carriers are analogous to individual sand grains. The insulating medium and its internal medium serve to contain an electrostatic charge possessing electric potential energy, whereas the hourglass serves as a container for a timekeeping substance possessing gravitational potential energy. The insulated charge storage element may have a supporting structure, such as a semiconductor substrate upon which it rests, similar to the supporting frame of the hourglass. Although the timekeeping substance within the hourglass is reused, the charge within the present invention is not reused after it is discharged.

In each timekeeping device, a time period can be correlated with a flowing or discharge process: electric charge from the charge storage element and sand (or other timekeeping substance) within the hourglass. Like sand in an hourglass, a larger initial amount of electrostatic charge extends the measurable time period for the charge storage element. In some implementations of the present invention, the dimensions of the insulating media and its physical properties are similar to the width of the hourglass aperture in that the dimensions and properties of the insulating media can control the discharge rate of the electric charge. In fact, the barrier presented by the insulating media can be so great that the electric charge does not flow regularly or does not discharge at all. Although the amount of retained electrostatic charge within the charge storage element cannot be directly perceived, it can be indirectly determined by first performing some type of physical measurement and then transforming the first measurement into some form that is humanly perceivable.

Introduction to Embodiments of the Present Invention

The present invention may be implemented using a variety of configurations for the charge storage element and supporting elements, and the method of observing the electric potential may vary depending upon the chosen embodiment.

A first embodiment of the present invention uses a modified non-volatile memory cell, herein termed a "time cell", as the charge storage element. Initially, the time cell, which has a predetermined discharge rate, is programmed. Then, the retained electrostatic charge is indirectly observed at some later point in time by performing a read operation on the time cell in order to make a determination as to whether or not the threshold voltage of the time cell is above a predetermined threshold voltage. The result of the read operation then determines whether or not a predetermined elapsed time period has elapsed. After the time cell has discharged so that its threshold voltage is below the predetermined threshold voltage, it has reached a substantially discharged state. For reasons described further below, this type of time cell may also be termed a "binary time cell".

A second embodiment of the present invention describes the manner in which the present invention may be broadly viewed as covering multiple types of horological devices that operate according to the same principles described with respect to the first embodiment of the invention.

A third embodiment of the present invention extends the first embodiment by employing a set of time cells, each cell possessing a different discharge function, thereby providing a range of granularity for concurrently measuring multiple time periods. The retained electrostatic charges are observed by performing read operations on the time cells to determine whether the associated time periods have elapsed.

A fourth embodiment of the present invention extends the concept of using the floating gate of a floating gate field effect transistor as the insulated charge storage element for an horological device. Preferably, a programming transistor and a sensing transistor with a common floating gate are used together. The common, expanded floating gate is used to store an amount of electrostatic charge that is greater than the amount of electrostatic charge stored by a typical floating gate field effect transistor (FET), or FGFET. The remaining electric potential of the floating gate is then indirectly observed by a sensing device, which then converts its measurement into an elapsed time value. Discharge function characteristics can be optionally stored as part of the horological device. For reasons described further below, this type of time cell may also be termed an "analog time cell".

In addition to the embodiments mentioned above, methods, systems, and computer program products for using the horological device are also presented.

Modified Non-volatile RAM Memory Cell as Horological Device

A first embodiment of the present invention uses a modified non-volatile memory cell, called a time cell, as an horological device. Non-volatile memory devices, which are memory devices which retain data when power is removed from the memory device or from the system containing the memory device, are well known in the art of computer technology. Many different implementations of non-volatile memory are commercially available, and different types of non-volatile memory operate in different manners.

Certain types of non-volatile memory lie outside of the scope of the present invention because they do not incorporate a charge storage element. For example, programmable read-only memories, or PROMs, are read-only memories that can be written to or programmed only once, typically with special equipment that burns out fusible links in a network of logic, thereby setting a specific memory location to a desired logic level and establishing read-only data values. Hence, these types of memories store data without a charge storage element.

Many other types of non-volatile memory cells comprise charge storage elements. Hence, the form of the time cell of the present invention may be based on many different types of non-volatile memory cells, such as an EPROM cell, an EEPROM cell, or any other type of non-volatile memory cell comprising an insulated charge storage element. For example, an electrically programmable read-only memory (EPROM) can be electrically programmed and then erased by exposure to ultraviolet light at a later time. An electrically erasable programmable read-only memory (EEPROM) can be electrically programmed and electrically erased. Specifically, in the first embodiment of the present invention, a generic non-volatile memory cell has been modified to function as a time cell in which an electrostatic charge is accumulated within the insulated charge storage element of the modified non-volatile memory cell.

The additional feature of erasing the time cell by discharging the insulated charge storage element is not essential to the present invention. The advantages and disadvantages of incorporating an additional erasure feature are described further below.

Although the present invention may be based on different types of non-volatile memory cells, the following examples refer to a simple field effect transistor containing a programmable floating gate structure. However, one of ordinary skill in the art would appreciate that the structure of the time cell may vary depending on the implementation. For example, the time cell may have an erase gate and other device structures or elements in addition to the structures or elements depicted in the examples. The depicted examples are not meant to imply limitations with respect to the present invention but rather provide information concerning the range of devices that may support the storage and discharge of an electrostatic charge within an insulated charge storage element in accordance with an embodiment of the present invention.

As is described in more detail further below, the charge needed to program the modified non-volatile memory cell must be injected into or through the insulating material of the charge storage element. Different mechanisms of programming the modified non-volatile memory cell are viable, although the different mechanisms have different requirements and characteristics that may lead a designer to prefer one mechanism over another. In the following examples, the charge is injected via a mechanism called channel hot electron injection. However, different mechanisms may be used, and one of ordinary skill in the art would appreciate that the injection mechanism may vary depending on the implementation of the present invention. The depicted examples are not meant to imply limitations with respect to the present invention but rather provide information concerning a preferred injection mechanism in accordance with an embodiment of the present invention.

With reference to FIG. 1A, a diagram depicts a typical non-volatile memory cell containing a charge storage element implemented as a typical floating gate field effect transistor. The operation of floating gate field effect transistors (FGFETs) are well-known in the art. The operation of a typical FGFET is first discussed in order to provide background information, which is then followed by a discussion of an embodiment of the present invention in which a typical non-volatile memory cell can be modified to form a time cell that can be used as an horological device in accordance with the present invention. FIG. 1A depicts an n-channel or n-type floating gate FET. Although a p-type FET may be used, in which case alternative programming mechanisms may be desirable, it has been found in the prior art that an n-type FET with channel hot electron (CHE) injection into the floating gate provides the most efficient operation for programming the memory cell, as discussed in more detail further below.

N-type floating gate FET 100 is formed on a monocrystalline silicon substrate that has been lightly doped with a p-type acceptor ion for generating holes, such as boron, to form P-substrate 102. Source 104 and drain 106 are formed in the substrate by creating two regions that are highly doped with an n-type donor ion for donating free electrons, such as phosphorus. Alternatively, the source and the drain may be formed in a p-well region in a silicon substrate. The region between the source and the drain forms the channel in which minority current carriers flow (in this case, electrons) when an electrical field is applied over the channel.

Conductive contacts 108 and 110 from the source and the drain, respectively, are insulated from other portions of the device by insulating regions 112 and 114, respectively, and the conductive leads allow current to flow to or from the source and the drain when appropriate. In FIG. 1A, the insulating regions are formed by silicon oxide ($SiO_2$) regions, but alternatively, other insulating materials may be used. Other oxide regions and other optional structures or elements are not shown, and the structures of the device are not drawn to scale.

Control gate 116 and floating gate 118 are regions that are separated from other portions of the device by insulating region 120. Floating gate 118 may be polysilicon (also termed amorphous, multi-crystalline, or polycrystalline silicon), while control gate 116 may be metal or polysilicon. A portion of insulating region 120 between the floating gate and the channel portion of the substrate is termed the "tunneling oxide" or "tunneling region" 122 for reasons which will become apparent in the description below. FIG. 1B depicts a symbolic representation for an FGFET.

In a typical n-type FET, the application of a positive direct current voltage to the gate over the channel turns on the FET by attracting electrons to the channel region, thereby enabling the channel region to become conductive. In floating gate FET 100, control gate 116 performs the gate function of turning on and off FET 100. The voltage of the control gate must be equal to or greater than the FET's threshold voltage, a characteristic parameter that determines the point at which the control gate voltage has become large enough to enable the channel of the FET to become conductive, or in other words, to turn on the FET.

The FGFET gets its memory functionality by programming the floating gate. During a programming operation, the floating gate receives an amount of charge. If the floating gate is storing charge of an appropriate polarity, the FGFET cannot turn on, thus indicating one memory state. When the floating gate is not storing any charge, the FGFET operates as if it were an FET without a floating gate, which indicates the other memory state. The two memory states support the operation of binary logic in which the two memory states represent either a logical "0" or a logical "1" stored within the memory cell as a single bit.

With reference now to FIGS. 1C–1D, graphs depict the effect upon the threshold voltage by a programmed floating gate of an n-type floating gate field effect transistor. In FIG. 1C, before the floating gate receives a charge during a programming operation, any voltage at the control gate greater than the FGFET's threshold voltage allows current to flow through the drain, assuming the drain is positively biased with respect to the source. Hence, during a memory operation to read the bit value stored in the memory cell containing the FGFET, a read operation voltage at the control gate greater than the threshold voltage turns on the FGFET, thereby providing an indication that the floating gate has not been programmed.

In FIG. 1D, after the floating gate receives a charge during a programming operation, any voltage at the control gate less than the FGFET's threshold voltage will not cause current to flow through the drain, assuming the drain is positively biased with respect to the source. Hence, during a memory operation to read the bit value stored in the memory cell containing the FGFET, a read operation voltage at the control gate less than the threshold voltage does not turn on the FGFET, thereby providing an indication that the floating gate has been programmed.

The two operational states of the floating gate support binary logic. The logic circuits that include the memory cell will have a convention as to which operational state of the FGFET indicates a binary "1" or a binary "0". Hence, when a floating gate is programmed, one can interpret the operation as setting the memory cell to a logical "1" or a logical "0". By performing a read operation on the memory cell, a binary determination can be made as to whether or not the memory cell contains a logical "1" or logical "0".

A memory device containing non-volatile memory cells may have an internal state machine that provides programming algorithms for storing and erasing data according to the type of architecture or arrangement for its memory cells or memory cell arrays. Since many types of non-volatile memory are well-known and commercially available, it should be noted that an essential characteristic of the present invention is the insulated charge storage element and its programmability. The present invention could be incorporated into many different types of non-volatile memory arrays or architectures that have the necessary essential characteristics, and memory array circuitry will not be further discussed.

A non-volatile memory cell can be programmed by a variety of physical processes. The charge needed to program the non-volatile memory cell must be injected into or through the insulating material of the charge storage element. Different mechanisms of programming the non-volatile memory cell are possible, although the different mechanisms have different requirements and characteristics that may lead a designer to prefer one mechanism over another.

One electron injection mechanism used in floating gate devices is Fowler-Nordheim tunneling, which is a field-assisted electron tunneling process. Assuming that the floating gate is composed of polysilicon, when a large voltage is applied across the polysilicon/$SiO_2$/silicon structure form by the floating gate, insulating material, and channel, the energy barrier is narrowed enough such that electrons can tunnel through the barrier from the silicon conduction band into the silicon oxide conduction band. A high injection field on the order of 10 MV/cm is needed across the oxide during a programming operation that uses Fowler-Nordheim tunneling. In order to reach these high-field values and limit the voltages needed during programming, very thin tunnel oxides are used, e.g., an applied voltage of 10V across an oxide of 10 nm (nanometer) thickness. In order to reduce the voltage, the tunnel oxide can be thinner, although a thickness of 8 nm has been recognized as a lower limit necessary for good charge-retention behavior. Additional benefits of thin oxides include a shorter channel length and a lower read operation voltage. However, thin oxides can be difficult to grow with low defect densities, which is required to obtain good charge-retention behavior. The main disadvantage in using Fowler-Nordheim tunneling for programming an FGFET is the long time periods necessary to accumulate sufficient charge in the floating gate. More information on Fowler-Nordheim tunneling may be found in *Nonvolatile Semiconductor Memory Technology: A Comprehensive Guide to Understanding and Using NVSM Devices,* edited by William D. Brown and Joe E. Brewer, IEEE Press, 1998.

A preferred programming mechanism for the FGFET shown in FIG. 1A is channel hot electron (CHE) injection, which is a much quicker process for injecting charge into the floating gate. At large drain-to-source biases, the minority carriers that flow in the channel, which are electrons in an n-type FGFET, are accelerated by the large electric field found at the drain side of the channel. This gives rise to impact ionization at the drain, and most of the minority carriers generated by the impact ionization are collected at the drain. Some of the electrons gain enough energy to allow them to surmount the $SiO_2$ energy barrier and are emitted into the oxide, which gives rise to a hot-carrier injection control gate current.

The control gate current of the FGFET consists of those electrons that actually reach the control gate, while some of the electrons are collected at the floating gate. The main disadvantage of CHE injection is its low injection efficiency and, consequently, its high power consumption. For favorable electron injection, at fixed bias conditions, it is desirable to have a high vertical electric field and a high lateral electric field, which are conditions that tend to be in contention. In an FGFET, the lateral field along the channel tends to decrease for an increasing control gate voltage, while the vertical field obviously increases for an increasing control gate voltage. Hence, in order to generate a large number of hot electrons, a lower control gate voltage and a higher drain voltage are desirable. However, for electron injection and collection on the floating gate, a higher control gate voltage and a lower drain voltage are desirable. As a compromise, both control gate and drain voltages are kept high. The programming voltages are usually much greater than the normal operating voltages applied to either the control gate or the drain.

The FGFET memory cell is termed a non-volatile memory cell because the charge within the floating gate is essentially stable and non-volatile. In contrast, a common dynamic random access memory (DRAM) is a volatile semiconductor read-write memory that requires periodic refreshing to preserve the charges on its capacitive memory cells that retain data.

Data retention is a standard measure of a device's ability to retain data over time. This is a critical reliability parameter for programmable non-volatile memories. High temperature operating life and data retention bake are the primary reliability tests for this parameter. The typical minimum pattern retention time for many commercially available memories is 10 years at 150° C. and 20 years at 125° C., whereas the typical expected operating temperature for most devices is −40° C. to 125° C.

The most important mechanism by which an FGFET fails to retain data is Fowler-Nordheim tunneling. After an n-type FGFET has been programmed by accumulating electrons within the floating gate, the floating gate has a significant electric potential, and the electrons tunnel through the insulating oxide between the floating gate into the channel. Therefore, this portion of the insulating region is termed the "tunneling oxide" or "tunneling region", as shown by tunneling region 122 in FIG. 1A.

As the floating gate loses electrons, the electric potential generated by the stored electrons diminishes, and the threshold voltage for the FGFET begins to shift back to its non-programmed threshold voltage. At some point, a read operation on a programmed memory cell with significant loss of charge will turn on and draw a significant amount of drain current. The FGFET then appears to be a non-programmed FGFET. Assuming that the FGFET was programmed in order to store a bit value, the loss of charge will cause an incorrect bit value to be read from the memory cell.

With reference now to FIGS. 1E–1J, spreadsheet models and graphs depict the threshold voltage retention characteristics over long periods of time for non-volatile memory cells which have traditional dimensions and geometries. Fowler-Nordheim tunneling effects are well-known in the art and have been modeled so extensively that Fowler-Nordheim equation calculations may be computed within a spreadsheet. For more information, see Richard G. Forbes, "Use of a spreadsheet for Fowler-Nordheim equation calculations", *J. Vac. Sci. Technol. B—Microelectronics and Nanometer Structures* 17(2), pp. 534–541, March/April 1999.

Typical widths for tunneling oxides are commonly 8 nanometers (nm) to 10 nm. FIG. 1E shows a common set of parameters for a floating gate FET, including a tunnel oxide thickness of 80 angstroms or 8 nm, and FIG. 1F shows a graph of the threshold voltage of a floating gate FET over a period of 30 years at evenly spaced, one year intervals. As shown in FIG. 1F, the threshold voltage not only drops slowly over time but the rate of change also diminishes over time.

Figure 1H:
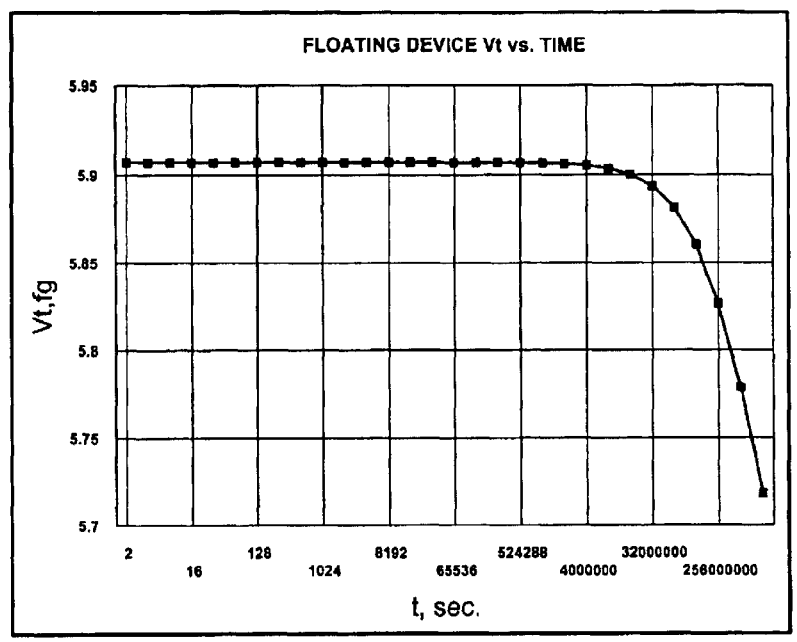
Figure 1J:
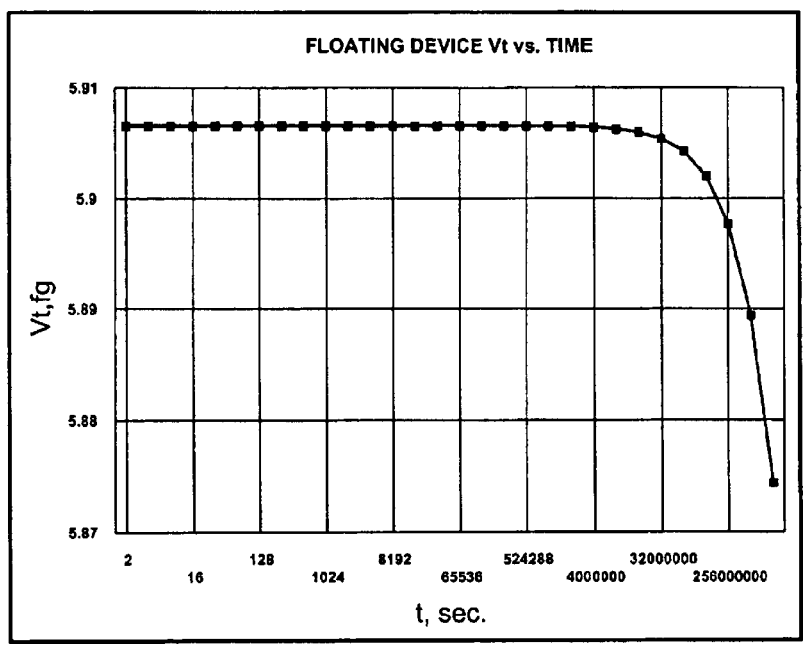

FIG. 1G shows a common set of parameters for a floating gate FET, including a tunnel oxide thickness of 80 angstroms or 8 nm. FIG. 1H shows a graph of the threshold voltage of a floating gate FET over a period of 32 years. FIG. 1I shows a common set of parameters for a floating gate FET, including a tunnel oxide thickness of 85 angstroms or 8.5 nm. FIG. 1J shows a graph of the threshold voltage of a floating gate FET over a period of 32 years.

In both FIG. 1H and FIG. 1J, the number of seconds along the x-axis increases exponentially at each interval, thereby providing a perspective on the drop in threshold voltage over both short and long periods of time. As can be seen in FIG. 1H and FIG. 1J, the floating gate retains its charge very well; the charge does not begin to significantly decay until at least 1 year after the programming operation, and the threshold voltage has diminished only a few percent over a 32 year period.

With this background explanation of the operation of a typical floating gate FET, the description now turns to an explanation of the manner in which the first embodiment of the present invention modifies a non-volatile memory cell containing a charge storage element, such as a floating gate FET, to construct the basic form of an horological device called a time cell.

This embodiment of the present invention makes the novel observation that the rate at which a non-volatile memory cell loses its charge can be selected or constructed in a manner that allows the discharge process to be useful. Using this novel observation, a modified non-volatile memory cell can be engineered as an horological device, herein termed a "time cell", that allows observations of its state such that elapsed time periods can be determined. By manipulating the insulating medium around the charge storage element within the time cell and its initial conditions, the rate of the discharge process can be controlled in a manner such that the time cell can measure a known elapsed time period.

In general, the dimensions and physical properties of the insulating medium control the ability of electrons to tunnel from the charge storage element through the insulating medium via Fowler-Nordheim tunneling. Assuming a particular type of insulating medium is used, the physical dimensions or the geometry of an insulating medium, such as its thickness, can be reduced in order to increase the number of electrons that experience Fowler-Nordheim tunneling, thereby causing the charge storage element to discharge more quickly.

More specifically, in a floating gate FET, as discussed above, the thickness of the tunnel oxide controls the ability of electrons to tunnel from the floating gate through the tunnel oxide via Fowler-Nordheim tunneling. Hence, one method of creating a time cell similar in form to a floating gate FET is to reduce the tunnel oxide thickness of the floating gate FET in order to increase the number of electrons that experience Fowler-Nordheim tunneling, thereby inducing the floating gate of the FGFET to discharge more quickly.

After a time cell is constructed with the necessary requirements, the time cell then operates as an horological device as follows. Initially, the time cell, which has a predetermined discharge rate, is programmed. As the time cell loses its charge, its threshold voltage shifts, which changes its operational characteristics.

A read operation can be performed on the time cell in a manner similar to performing a read operation on a non-volatile memory cell in order to read the non-volatile memory cell's data value or bit value. In the case of the time cell, however, the read operation is performed in order to read the time cell's "elapsed time value".

One can determine whether or not the read operation's voltage is above or below the threshold voltage of the time cell's transistor by observing whether or not the transistor is turned on by the read voltage. This operation provides an indirect observation of the electric potential of the charge storage element in the time cell and its retained electrostatic charge. By knowing the amount of time that should elapse before the charge storage element loses enough charge to reach a particular electric potential, or in other words, by knowing the amount of time that should elapse before the transistor containing the charge storage element reaches a particular threshold voltage, the read operation can determine whether or not a predetermined time period has elapsed.

Figure 1K:
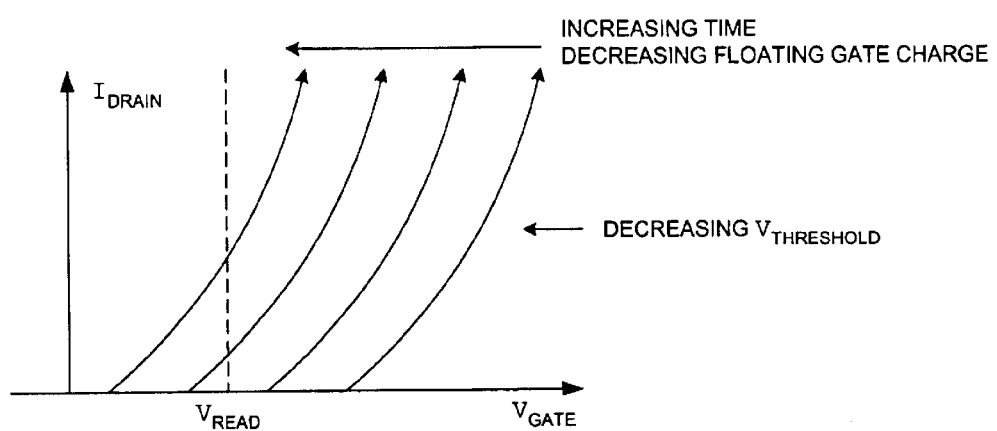
FIG. 1K depicts a set of threshold voltage response graphs showing the change in threshold voltage of an n-type floating gate field effect transistor as its programmed floating gate loses its charge.

With reference now to FIG. 1K, a diagram depicts a set of threshold voltage response graphs showing the change in threshold voltage of an n-type floating gate field effect transistor as its programmed floating gate loses its charge. After the floating gate receives a charge during a programming operation, any voltage at the control gate less than the FGFET's threshold voltage will not cause current to flow through the drain, assuming the drain is positively biased with respect to the source. Hence, during a memory operation to read the elapsed time value stored in the time cell containing the FGFET, in a memory operation that is similar to a read operation of a non-volatile memory cell, a read operation voltage at the control gate that is less than the threshold voltage will properly determine that the floating gate is holding a sufficiently large amount of charge to prevent the FGFET from turning on during the read operation.

Over time, as the floating gate loses its charge, the threshold voltage of the FGFET shifts so that it would require less and less control gate voltage to turn on the transistor. At some point, the read operation voltage will turn on the transistor, which also indicates that the electric potential of the floating gate has been reduced to a particular value. By knowing the discharge function of the floating gate, a read operation on the time cell can determine whether or not a predetermined time period has elapsed. After the predetermined time period has elapsed, the floating gate can be considered to have reached a substantially discharged state.

With reference now to FIGS. 1L–1Q, spreadsheet models and graphs depict the threshold voltage retention characteristics of an n-type floating gate field effect transistor in a time cell in which the tunnel oxide has been thinned.

Figure 1M:
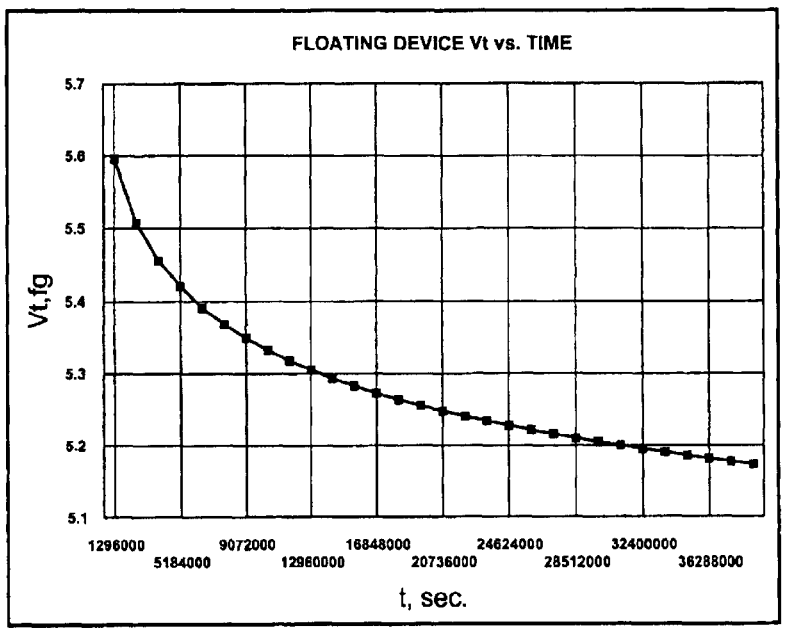
Figure 10:
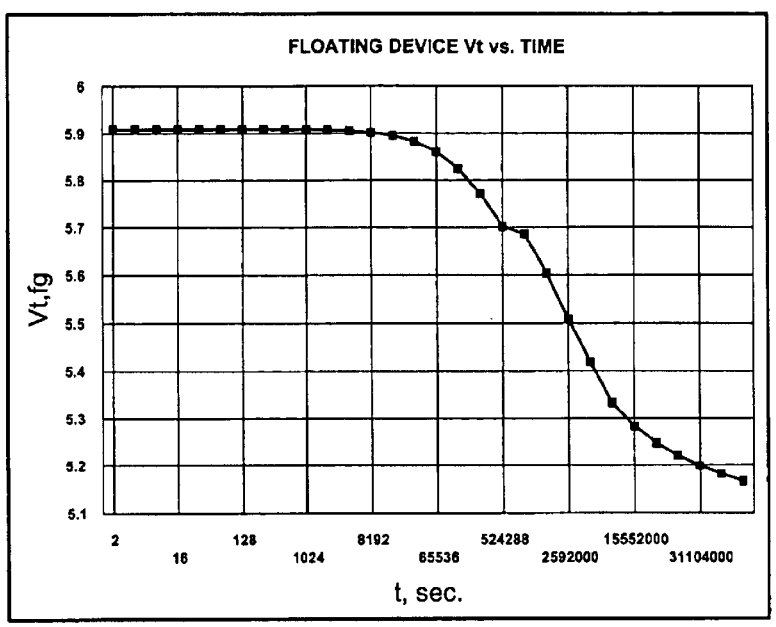

Typical widths for tunneling oxides in FGFETs are commonly 8 nm to 10 nm. FIG. 1L shows a set of parameters for a floating gate FET with a thin tunnel oxide of 65 angstroms or 6.5 nm. FIG. 1M shows a graph of the threshold voltage of a floating gate FET over a period of 15 months at two week, evenly spaced intervals. As shown in FIG. 1M, the threshold voltage not only drops over time but the rate of change also diminishes over time. In contrast to the graphs shown in FIG. 1H and FIG. 1J, the threshold voltage shown in FIG. 1M has dropped significantly within one month, or 2,592,000 seconds. In contrast to the graph shown in FIG. 1F, the threshold voltage shown in FIG. 1M drops significantly more quickly.

FIG. 1N shows a set of parameters for a floating gate FET with a thin tunnel oxide of 65 angstroms or 6.5 nm, and FIG. 1O shows a graph of the threshold voltage of this floating gate FET over a period of 16 months. FIG. 1P shows a set of parameters for a floating gate FET with a thin tunnel oxide of 60 angstroms or 6 nm, and FIG. 1Q shows a graph of the threshold voltage of this floating gate FET over a period of 16 months.

Figure 1Q:
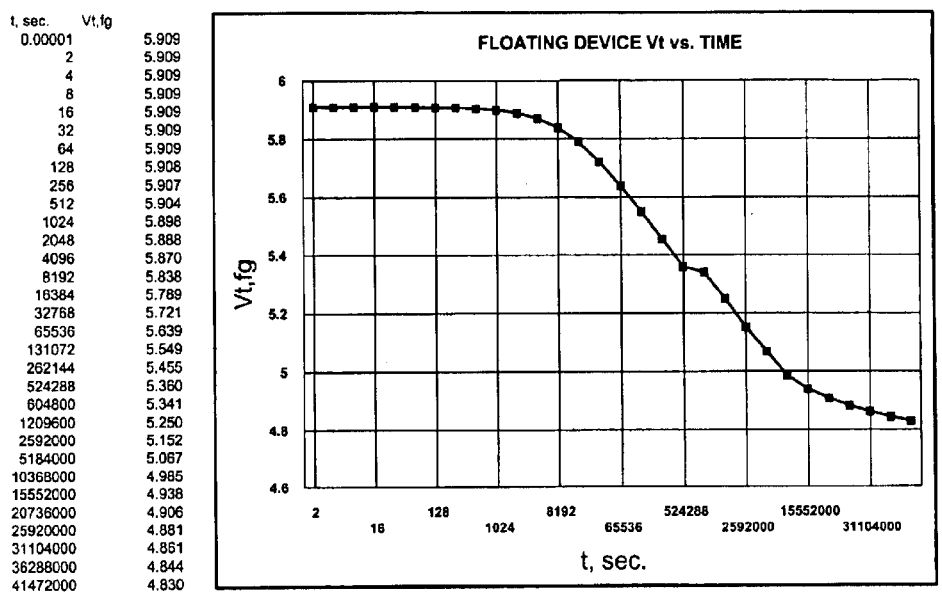

In both FIG. 1O and FIG. 1Q, the number of seconds along the x-axis increases exponentially at each interval, with one uneven interval exactly placed at the one week elapsed time interval. This exponentially increasing time axis provides a perspective on the drop in threshold voltage over both short and long periods of time. As can be seen in the graphs, the floating gates whose decay functions are shown in FIG. 1O and FIG. 1Q do not retain their charges as well as the floating gates whose decay functions are shown in FIG. 1H and FIG. 1J. One can see that the threshold voltage begins to drop significantly after about 18 hours in the graph in FIG. 1O and after about 4 hours in the graph in FIG. 1Q.

As can be seen in the graphs, the floating gate can be constructed to lose its charge relatively quickly, and the time period can be selected depending upon the application for which one desires to use a time cell as an horological device. If the application requires accurate resolution of a threshold voltage within a particular range of time, then the decay or discharge function can be tuned to have a significant slope through that time period, and the time cell can be constructed with the particular physical dimensions that are required. For example, if one desires to accurate measure a one week time period that is accurate to a few percent, i.e. a few hours, then one would use a time cell with a charge storage element that begins to lose significant charge in a manner similar to that shown in FIG. 1Q. Obviously, as is the case with many electronic devices, significant effort may need to be applied to each step during the manufacture of the device in order to ensure that the time cells are created with as much precision as possible.

It should also be noted that, in addition to manipulating the dimensions of the tunneling region, the operational characteristics of the time cell over the elapsed time period also depend on the time cell's initial conditions. For example, the initial amount of charge stored in the floating gate sets its initial electric potential, and a larger amount of stored charge causes the floating gate to have a higher initial electric potential. The threshold voltage of the FGFET in the time cell will then start at a larger value, which will allow the time cell to monitor a longer time period and will raise the threshold voltage over the entire monitored time period.

This type of variability can be seen in the fact that the threshold voltage curves in the graphs shown in FIG. 1M, FIG. 1O, and FIG. 1Q could begin at different values. A larger amount of initial charge in the floating gate causes a higher initial threshold voltage. As a result, a higher initial threshold voltage causes a higher threshold voltage value at each time interval. From one perspective, the threshold voltage curve can be viewed as being shifted rightward as the initial charge is increased. Hence, it is also important that the programming operation be performed in a manner in which the floating gate is initialized with an appropriate initial amount of electrostatic charge, or equivalently, in a manner in which the threshold voltage begins at an appropriate initial value.

For any desired initial starting condition for the time cell, the floating gate may be programmed for variable lengths of time. For example, to store more charge in the floating gate, the programming operation is performed for a longer period of time. Different methods may be used to determine the specific length of programming time for a given time cell configuration.

For example, the electric potentials of a set of floating gates for a test set of time cells are measured immediately after a set of programming operations on those time cells. By varying the lengths of the programming operations, the electric potentials of the floating gates will vary, and the measured electric potentials can be correlated with a desired threshold voltage response curve.

Preferably, the required length of programming time for any given time cell design or size may be found empirically by charging a test set of time cells. Each time cell in the set of time cells would be charged for a different length of time. Each time cell would then be monitored for its change in threshold voltage over a period of time. The initial programming times may then be correlated with the threshold voltage decay responses, and this information would be stored for later use.

Obviously, the physical properties of the time cell can not be changed after the time cell is manufactured. A time cell can be manufactured to certain specifications, however, with the assumption that its operational behavior has been correctly modeled for those specifications. The testing procedures then determine the tolerances of the manufactured devices. With this empirical information, a time cell with particular dimensions or physical characteristics could be employed to monitor a range of time periods that varies with its programming operation.

Data sheets or data books containing these types of empirical values or specifications are well-known in the electronic arts. Assuming that the programming process or programming devices are also standardized, for any given type of time cell, a manufacturer's data book can store programming times and their correlated time periods and tolerances so that a user may employ a given type of time cell for monitoring a desired time period.

Other methods for determining the proper programming parameters may be employed without affecting the scope of the present invention.

As previously described, the two operational states of the floating gate support binary logic. The logic circuits that include the time cell will have a convention as to which operational state of the FET indicates a binary "1" or a binary "0". Under normal operation, a read operation on the time cell provides a binary determination as to whether or not the time cell contains a logical "1" or logical "0".

Using a time cell that has been designed to reduce the threshold voltage of its transistor to a predetermined value within a predetermined period of time after it has been programmed, a read operation can determine whether or not the predetermined period of time has passed. After the predetermined period of time has passed, the electrostatic charge is the time cell has been substantially discharged, and the time cell no longer usefully measures the passage of time and only indicates that a particular measure of time has passed. Continuing with the example concerning binary logic, it can be assumed that a programmed time cell represents a logical "1". After a particular time cell is programmed, a read operation on the programmed time cell returns a logical "1". After its predetermined time period has passed, the time cell will have lost its charge, and the time cell will no longer appear to be programmed, after which a read operation on the time cell returns a logical "0". Hence, the expiration of the time period for a programmed time cell can be determined to have passed when a read operation on the time cell returns a logical "0". More simply, a time cell "has expired" if it contains a logical "0" at some point after it has been programmed. The binary determination of whether or not the time cell has expired provides a basis for calling this type of time cell a "binary time cell". The explanation of an "analog time cell" will be described further below with respect to another embodiment of the present invention.

It should be noted that a read operation on a transistor in a binary time cell may occur during a period of time in which the read operation could produce an indeterminate result if not properly considered and appropriately compensated. If a read operation is performed when the current threshold voltage of the transistor has almost reached its predetermined value, i.e. when a read operation would almost cause the transistor to turn on, then an indeterminate result could be produced. In order to compensate, appropriate circuitry may be built into the time cell in order to ensure that a determinate result is produced, thereby producing a logical "1" or "0" as an output only when the predetermined time period of the binary time cell has passed. This type of compensation should only contribute an insignificant amount of imprecision into the monitored time period.

While the previous description of the present invention focused on thinning the insulating region between the floating gate and the channel of the FGFET, i.e. the tunneling oxide, it should be noted that the desired tunneling effect could be accomplished in other regions of a time cell depending upon the structures and elements within the time cell, their physical characteristics, geometries, etc. In other words, while considering other requirements and conditions, it might be desirable that the discharge process occurs within a different region of the time cell.

For example, a particular type of non-volatile memory cell that forms the basis for the time cell may contain an erase gate or other element not shown in FIG. 1A, and to maintain good operational characteristics, it is decided that the thickness of the insulating layer between the floating gate and the channel should remain greater than 8 nm, which does not provide a desired discharge rate for the floating gate. In fact, for a desired time measurement period of 6 months, the tunneling effect through this insulating layer is almost negligible. However, it may be possible to achieve the desired discharging rate by allowing tunneling through a thinned insulating material between the floating gate and another region within the cell where this other region does not have similar operational restrictions.

Alternatively, based on fabrication or other considerations, it might be desirable to continue using a typical thickness for the insulating layer between the floating gate and the channel. However, a special element, structure, or region could adjoin the floating gate such that a majority of the tunneling effect occurs through this special dedicated region, termed a "dominant tunneling region". In this case, extra processing or precision could be focused on controlling the fabrication of the dominant tunneling region so that its operational characteristics, i.e. its discharge rate, closely approximates its model behavior.

A time cell that is used for this embodiment of the present invention may comprise an erasing element, such as an erase gate, that allows the time cell to be erased, as is well known in the art. When the time cell is erased at any point in time after the charge storage element has been programmed, the charge storage element is purged of most or all of its retained electrostatic charge. Erasure is generally performed by applying an electric field that is opposite to the electric field used to program the charge storage element.

An erasing element provides the advantage of allowing repeated use of the time cell as an horological device. After the time cell has been erased, it may be reprogrammed, thereby allowing another time period measurement.

However, an erase element has disadvantages. After the time cell has been erased, it might be impossible to determine a difference between a low electric potential in the charge storage element caused by leaking over a prolonged period or by erasing. Hence, the use of an erasing element introduces an administrative burden of tracking or determining whether the charge storage element has significantly leaked its charge or whether it has merely been erased. Additionally, repeated use of the time cell can change its operational characteristics. Multiple programming-erase cycles may change the leak rate of the charge storage element, thereby causing inaccuracies in the manner in which a time period is determined.

One advantage, though, is that the presence of an erasing element allows the time cell to be used for a wider variety of horological applications. However, these advantages and disadvantages should be weighed in making a decision to incorporate an erasing element into the time cell.

It is noted that this embodiment of the present invention relies upon various structures, programming operations, reading operations, and erasing operations of non-volatile memory cells comprising charge storage elements that were known and well-established in the prior art. However, the prior art did not teach the use of a non-volatile memory cell as an horological device. Moreover, in the prior art, charge leakage from the charge storage elements in non-volatile memory cells was viewed as a detrimental nuisance, and if anything, the prior art taught that charge leakage should be avoided and potentially eliminated. The present invention makes the novel observation that the charge leakage rate can be selected in a manner that allows it to be useful. Using this novel observation, the charge storage element in a non-volatile memory cell can be engineered as an horological device that allows measurements of its operation such that elapsed time periods can be determined. Specifically in this embodiment, as discussed above, the geometry and physical properties of the insulating medium through which the retained electric charge leaks is selected in a manner which controls the leak rate.

Differences between the Present Invention and Prior Art Devices that Store Electrostatic Charge The present invention has been described as an electrostatic hourglass, which provides a broad overview of the present invention, and the present invention has also been described in one embodiment in which a non-volatile memory cell is used as an horological device, thereby providing one example of the present invention. At this point, in light of the above descriptions of the present invention, it is appropriate to draw distinctions between the present invention and some prior art devices that use electrostatic charge in order to emphasize the novelty of the present invention.

There have been many prior art devices for using and studying electrostatic charge, some of which are only of historical interest. For example, a Leyden jar is an early form of capacitor or "electric condenser" which is formed by coating the inside and outside of a glass jar with a layer of metal, such as aluminum foil or tinfoil, although early versions contained gold leaves or a water solution in the interior. A brass rod punctures an insulating stopper of the jar, and the brass rod is connected to the inside layer of metal by a chain. An electrostatic charge can be stored in the jar by bringing the brass rod in contact with an electrical device, and an electric discharge occurs when the two layers of metal are connected with each other by a conductor.

Another electrostatic instrument is the electroscope, which detects electric charge by means of the mechanical forces exerted between electrically charged bodies within the instrument. In one version similar to the Leyden jar, two strips of gold leaf are suspended from a metal rod that punctures an insulating stopper of a glass jar that is coated with metal. When the electroscope is charged, the gold strips spread apart as the electric charge in the strips causes the strips to repel each other, and the angle between the strips is proportional to the received charge. Various types of modern electroscopes are presently used as instruments for measuring electrostatic charge.

Modern-day capacitors are a class of electrostatic storage devices for which the prior art recognizes that the action of discharging electrostatic charge is a temporally meaningful process. Simple capacitors usually consist of two plates made of an electrically conducting material, e.g., metal, separated by a non-conducting material (dielectric), e.g., air, ceramic, glass, etc. If an electric potential is applied to the capacitor plates, the plates become capacitively charged, one positively and one negatively. If the externally applied voltage is then removed from the capacitor's conductive contacts, the capacitor plates remain charged, and the electric charge maintains an electric potential between the two plates. The ability of the device for storing electric charge (capacitance) can be increased by increasing the area of the plates, by decreasing their separation, or by varying the substance used as the dielectric.

A capacitor can store energy, and a resistor placed in series with the capacitor will control the rate at which it charges or discharges, which produces a characteristic time dependence that can be modeled by an exponential function. The crucial parameter that describes the time dependence is the "time constant" RC. The time constant or RC product of a series circuit determines the speed at which the voltage across a capacitor can change. In industry, circuits combining resistors and capacitors are important because they can be used in timing circuits, signal generators, electrical signal shaping and filtering, and a variety of electronic equipment.

However, the discharge times of a capacitor are generally very short, usually on the order of milliseconds but possibly a few hours, even when very large capacitors are combined with very large resistances or impedances.

In order to charge or discharge the prior art devices noted above, they generally require conductive contact between the device and another material. For example, an electroscope or a capacitor can be capacitively charged by approaching it with a second electrically charged object, thereby inducing a separation of charge within the electroscope or the capacitor through open air or free space. However, the electroscope or the capacitor requires conductive contact with another material in order to permanently displace an amount of electric charge within the electroscope or the capacitor with the repulsive force of the approaching object.

The charging process of the charge storage element of the present invention differs from the charging process of an electroscope or a capacitor. In the present invention, the electric charge is transported through the insulating medium into the internal medium of the charge storage element without conductive contact. The insulating medium acts as a significant barrier to a change in the amount of charge stored in the internal medium during both receiving and discharging processes, thereby protecting the amount of charge in the internal medium without being a complete barrier. No conductive contact with the internal medium is required.

By causing rapid discharge through free space, open air, or non-conductive materials, a charged electroscope or a charged capacitor can be discharged without conductive contact with another material. In that case, the electric discharge is usually created by narrowing the gap between the charged object and another object such that the electric potential between the two objects becomes very great, at which point the electric charge jumps the gap or the insulating material experiences dielectric breakdown.

In one minor perspective, the above-described electroscope or capacitor and the present invention may both control electric discharge by varying a dimension of the insulating medium, such as its width. However, in the prior art, the stored electrostatic charge was usually either studied for indirect effects on other devices or regarded as an energy store to be used to perform some type of meaningful work. The prior art does not recognize that the stored electrostatic charge may be used as a timekeeping substance, as described above in the analogy between an hourglass and the present invention, which can be understood as an electrostatic hourglass.

Moreover, the prior art does not recognize that the discharge process itself is temporally meaningful for most electrostatic storage devices. In the case of the capacitor, in which the prior art does recognize that its discharge rate is temporally meaningful, the capacitor is not entirely insulated and only operates through the use of conductive contacts. Moreover, an horologically practical application involving a capacitor is only useful because the discharge process then powers other electrical or electronic components with which it has a conductive contact. In fact, capacitors are usually employed in a manner which cycles the charging and discharging processes in order to achieve some type of electrical time base. Usually called a relaxation oscillator or a relaxation generator, a fundamental frequency can be generated by the time of charging or discharging a capacitor or coil through a resistor. Hence, capacitors require a continuous power source as they dissipate relatively large amounts of energy for any horological application, which presents a motivating factor for the present invention in which the power source can be eliminated while the electronic horological device continues measuring time.

In contrast to a capacitor, the present invention relies upon a discharge process wherein an electrostatic charge is discharged from an insulated charge storage element over a period of time in such a manner as to allow one to use the discharge process itself as a temporally meaningful process. The manner in which the present invention accomplishes time measurement also allows for common, daily activities over potentially long periods of time.

Insulated Charge Storage Element as Horological Device

Figure 2A:
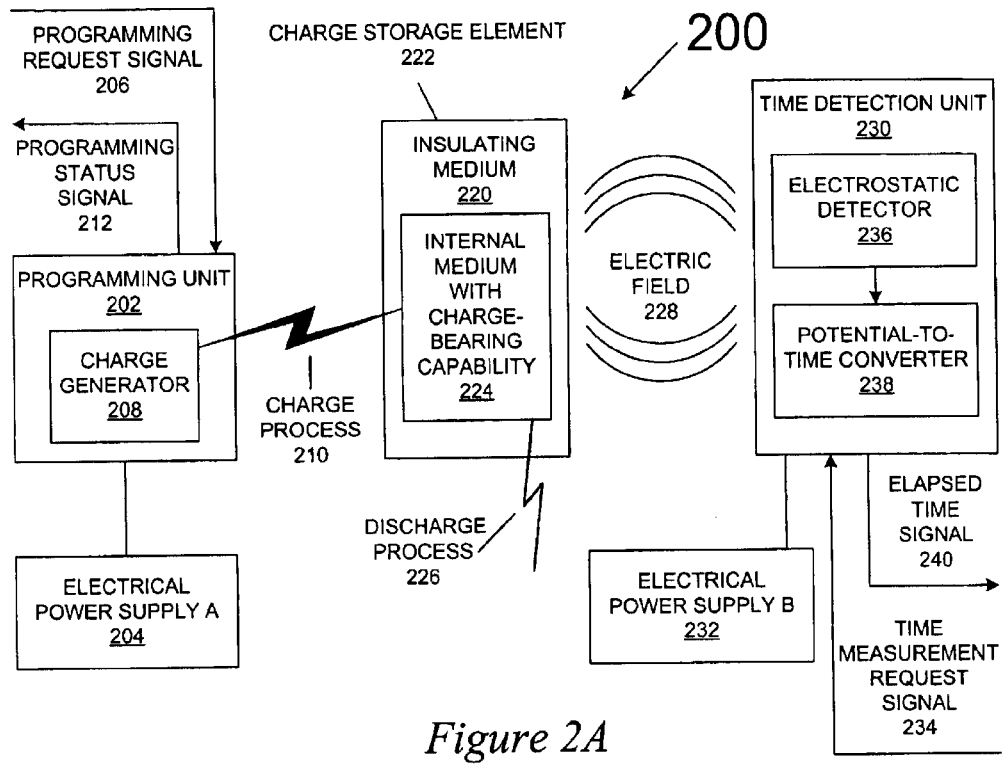
FIG. 2A depicts an insulated charge storage element usable as an horological device in accordance with an embodiment of the present invention.

With reference now to FIG. 2A, a block diagram depicts an insulated charge storage element usable as an horological device in accordance with an embodiment of the present invention. System 200 provides supporting elements, structures, or devices necessary for initializing the horological device at the beginning of a measured time period and for determining an elapsed time period since the initialization.

Programming unit 202 draws electrical power from electrical power supply A 204 for its operation. Programming unit 202 receives programming request signal 206, which instructs programming unit 202 to initialize the charge storage element, after which charge generator 208 uses charge process 210 to direct or inject electric charge into the insulating medium of the charge storage element.

As noted previously, a variety of programming mechanisms and programming times for charging the charge store element may be used in the present invention, wherein the choice will be dependent on several factors, such as the size and composition of the insulating medium, the geometry of the charge storage element, etc. For example, if the charge storage element is implemented as a floating gate within an FGFET, then the charge process may be implemented via channel hot electron injection. For other transistor configurations containing a charge storage element, other charge injection mechanisms may be appropriate. If an entirely different implementation comprises a charge storage element that is not contained within a transistor, then the programming mechanism may comprise an entirely different charge process, such as an electron beam or a laser beam capable of ionizing the internal medium, particularly if the insulating medium of the charge storage element comprises free space.

Programming unit 202 may provide an optional status signal 212 that indicates to the programming requester whether or not the programming operation was successful. In this manner, programming unit 202 may be operated in a synchronous manner. Alternatively, programming unit may operate asynchronously by generating a status signal only during error detection. A variety of mechanisms for communicating with the programming unit should be apparent to one of ordinary skill in the art.

The insulating medium of the charge storage element does not present a complete barrier to charge. Internal medium 224 of charge storage element 222 receives the electric charge through insulating medium 220, thereby giving charge storage element 222 an initial electric potential with respect to other components in system 200. The electrostatic charge stored in the internal medium immediately begins to be discharged through insulating medium 220 by electrostatic discharge process 226.

Time detection unit 230 draws electrical power from electrical power supply B 232 for its operation. Alternatively, a single electrical power supply could provide all necessary electrical power to system 200.

At some given point in time after charge storage element 222 has been programmed, time detection unit 230 receives time measurement request signal 234. Electrostatic detector 236 within time detection unit 230 determines, either directly or indirectly, a value for the remaining electric potential of charge storage element 222 through electric field 228, which is then converted to an elapsed time value or indication by potential-to-time converter 238. Elapsed time signal 240 is then sent to the device that requested an observation of the charge storage element. The elapsed time indication may have a variety of forms, such as a timestamp, a data value specifying the elapsed time as a number of time units, or a binary indication specifying whether or not the elapsed time is greater than a predetermined time period.

System 200 may be implemented as multiple devices. The programming unit may be physically coupled to a device containing the charge storage element during its programming operation, after which the programming unit is decoupled. At some later point in time, the time measurement unit may be physically coupled to the device containing the charge storage element during its elapsed time determination, after which the time measurement unit is decoupled. This multi-device, multi-operation environment may occur in an application in which the charge storage element is present in a portable device, such as a simple, externally powered, smart card, PCMCIA card, or other physical token or article of manufacture. As noted previously, however, the horological device of the present invention may be implemented in a variety of forms depending upon its application, such as a product in which the horological device is embedded.

Figure 2B:
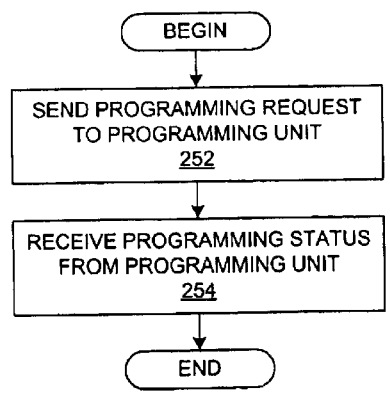
FIGS. 2B–2C depict simple processes that may be performed within a computer or electronic device that uses an horological device in accordance with the present invention.
Figure 2C:
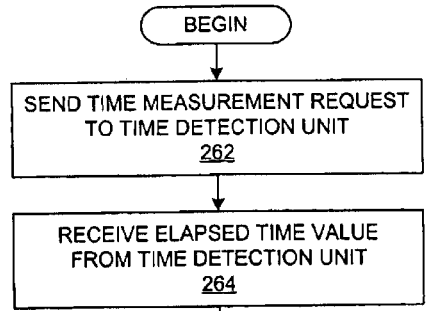

With reference now to FIGS. 2B–2C, flowcharts depict simple processes that may be performed within a computer or electronic device that uses an horological device in accordance with the present invention. The processes depicted in FIGS. 2B–2C may be performed by computer-like hardware or software within a data processing system. In FIG. 2B, the process for initializing the charge storage element begins by sending a programming request to the programming unit (step 252). Optionally, after the programming process is completed, a status signal is then received from the programming unit (step 254). The process is then complete, and the requesting logic may perform other actions.

In FIG. 2C, the process for obtaining a value or observation of an elapsed time period begins by sending a time measurement request to the time detection unit (step 262). An elapsed time value is then received from the time detection unit (step 264). The process is then complete, and the requesting logic may perform other actions. Various methods for sending and receiving data from the programming unit and time detection unit should be apparent to one of ordinary skill in the art. For example, the programming request and the time measurement request may be sent through a simple memory write command if the units are memory addressable.

One or More Sets of Binary Time Cells Employable as an Horological Device

A third embodiment of the present invention extends the first embodiment by employing a set of time cells as an horological device rather than a single time cell. In the first embodiment, a read operation is performed on a time cell that has been designed to reduce the threshold voltage of its transistor to a predetermined value within a predetermined period of time after it has been programmed, and the read operation can determine from the current state of the time cell whether or not the predetermined period of time has passed.

In the third embodiment, a set of read operations are performed on a set of time cells in which each time cell in the set has been designed to reduce the threshold voltage of its transistor to a predetermined value within a predetermined period of time after it has been programmed. In other words, each time cell in the set of time cells possesses a different discharge function from the other time cells in the set. Each time cell in the set decays differently over a different time period from the other time cells. The amount of retained electrostatic charge in the charge storage element of each time cell is observed by performing a read operation on each of the time cells to determine whether the associated time period for each time cell has elapsed. The read operation can determine from the current state of the time cell whether or not the predetermined period of time for each time cell has passed, thereby providing granularity for multiple time periods.

In a device in which each time cell contains a floating gate FET, the thickness of the tunneling oxide in each FGFET can be unique among the set of time cells. Each time cell will then experience a unique profile of electron tunneling, giving each floating gate a different charge decay function. As the retained charge of each floating gate diminishes, the threshold voltage of each FGFET will diminish at unique rates.

It should be noted that it is not necessary for each time cell to be constructed in the same manner. For example, the transistors in each time cell in the set of time cells may be different types of transistors. Moreover, if the transistors in the set of memory cells are the same type of transistor, the tunneling regions in each transistor may differ. Alternatively, each time cell may comprise a different type of charge storage element other than a transistor.

The discharge functions across a set of time cells may also differ because of varying initial conditions in each time cell. For example, a set of identical time cells may be programmed for different lengths of time, thereby providing each of the time cells with a different initial amount of charge and a different ability to measure shorter or longer time periods, although each type of time cell may be constructed differently and also have different programming periods. Continuing this example, in a device in which each time cell in a set of time cells contains a substantially identical floating gate FET, the programming period for each FGFET can be unique among the set of time cells. Each time cell will then experience a unique profile of electron tunneling, giving each floating gate a different charge decay function. As the retained charge of each floating gate diminishes, the threshold voltage of each FGFET will diminish in a unique fashion.

It should be noted that the concept of multiple discharge functions could also be applied to the second embodiment of the present invention discussed above. For example, multiple insulated charge storage elements could be charged and discharged in different manners.

Figure 3A:
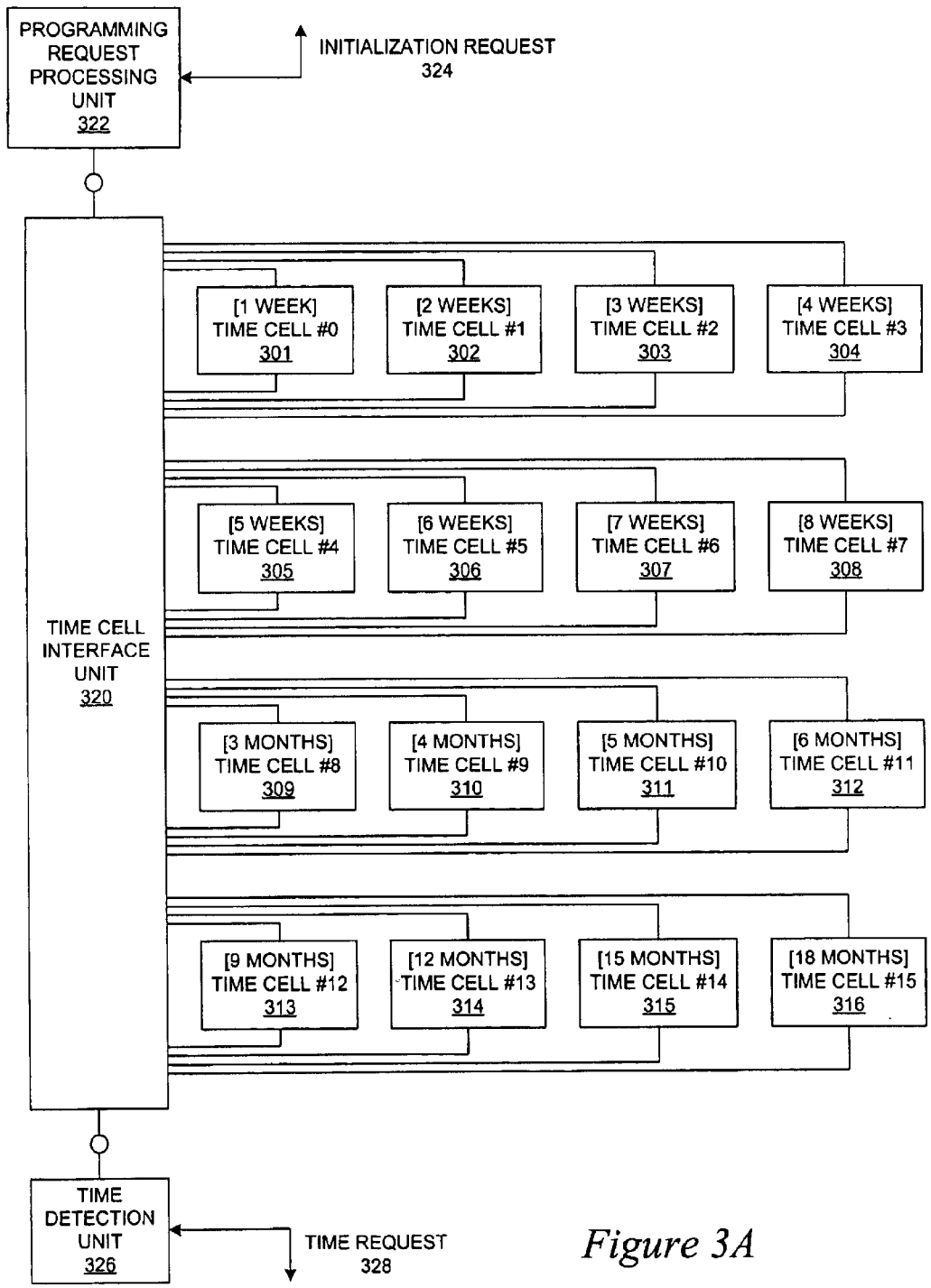
FIG. 3A depicts a set of time cells in accordance with an embodiment of the present invention.

With reference now to FIG. 3A, a block diagram depicts a set of time cells in accordance with the third embodiment of the present invention. FIG. 3A shows a set of sixteen time cells 301–316 that are constructed so that each time cell measures a unique period of time. For example, the time cells may be constructed in the manner described above with respect to non-volatile memory cells with varying tunnel regions or programming periods.

The time cells can be arranged as M×N arrays of different sizes, and the time cell array may be constructed in accordance with a variety of well-known memory architectures. As described above, the read operation for a time cell is similar to the read operation for a non-volatile memory cell, and operation of the time cell array may be very similar to the operation of a non-volatile memory. So, for example, the time cells may be arranged such that the time cells operate in byte-like units in which eight time cells are initialized or read in a single operation. The depicted or described time cell array should not be interpreted as limiting the present invention in the manner in which multiple time cells may be arranged.

As discussed previously, the specific geometric, dimensional, or physical characteristics of each individual time cell are selected when the device is manufactured. However, the time period measured by any given time cell may be adjusted, within specific ranges, by storing varying amount of electrostatic charge in the time cell.

Time cell interface unit 320 provides the necessary, simple circuitry for addressing time cells 301–316. Time cell interface unit 320 responds to signals from programming request processing unit 322 that indicate that one or more time cells are to be initialized. Programming request processing unit 322 responds to initialization requests 324 from other components in a data processing system.

Time cell interface unit 320 and time cells 301–316 may reside in a physically separable object, such as a portable device like as a simple, externally powered, smart card. In that case, time cell interface unit 320 obtains electricity for performing initialization or read operations from the device to which it interfaces for initialization operations or read operations.

Time cell interface unit 320 also responds to signals from time detection unit 326 that request the time indications of time cells 301–316. Time detection unit 326 responds to time requests 328 from other components in a data processing system. Time detection unit 326 may reside on a device that is physically separable from programming request processing unit 322. One or more read operations can determine from the current state of the time cells whether or not predetermined time periods have passed, thereby providing granularity for multiple time periods.

As noted previously, the time period for a programmed time cell can be determined to have expired when a read operation on the time cell returns a logical "0", or more simply, a "time cell has expired" if it contains a logical "0" at some point after it has been programmed. In the example shown in FIG. 3A, all of the sixteen time cells can be read in a single time detection operation, thereby producing sixteen bits of time information. Hence, a 16-bit binary value is able to represent the entire contents of the time cell array, and as explained below, the resulting 16-bit string can represent an elapsed time period since the initialization or the programming of the time cell array. The temporal resolution provided by the 16-bit value is dependent upon the time periods that are measurable by the time cell array.

Referring again to the example time cell array shown in FIG. 3A, it may be assumed that the time cell interface unit returns logical zeroes for expired time cells, and it may also be assumed that the time cell array is read such that the least significant time bit represents the time cell with the shortest time period. A bit string of 0xFFFF (hexadecimal format) represents that it has been less than one week since the time cell array was initialized; as an example in which the device has an accuracy of ±1%, time cell 301 can measure a one week time period within a range of plus or minus two hours. A bit string of 0xF800 represents that it has been somewhere between 5 and 6 months since the time cell array was initialized; as an example in which the device has an accuracy of ±1%, time cell 312 can measure a six month time period within a range of plus or minus two days. A bit string of 0x0000 represents that it has been over 18 months since the time cell array was initialized; as an example in which the device has an accuracy of ±1%, time cell 316 can measure an eighteen month time period within a range of plus or minus six days.

Time detection unit 326 may receive requests and return time indications in a variety of manners. For example, a time request may consist of a query command that contains a time value, which the time detection unit interprets as a request for a determination of whether or not the elapsed time period for the time cell array is greater than the time value in the query command. If so, the time detection unit returns a boolean value of "true", and if not, then the time detection unit returns a boolean value of "false". Alternatively, the time detection unit can return the bit string that is received from the time cell interface unit if the component that generated the request has knowledge of the time periods represented by the time cell array.

In another alternative, the time detection unit can return a binary value that represents the minimum, verifiable number of seconds that have elapsed since the initialization of the time cell array. For example, if the time cell array contains a current bit string of 0xF800, then the time cell array was initialized somewhere between 5 and 6 months ago; the time detection unit could then return a 32-bit binary value of 0x00C5C100, which is equal to a decimal value of 12,960,000, which is the number of seconds in five months at an average of 30 days per month, thereby returning a value that shows that the time cell array has measured an elapsed time period of at least five months. Many operating systems contain system calls which support the computation of time periods in units of seconds or less, so the original requester may actually desire to have the elapsed time returned in this form for ease of use.

The described time period representations should not be interpreted as limiting the present invention in the manner in which elapsed time periods may be reported.

An initialization request or programming request may initiate both an initialization operation for a newly manufactured time cell array and also an erase operation that effectively initializes all of the time cells in the time cell array or a subset of cells in the time cell array. Alternatively, the programming request processing unit may accept separate erase or reset requests. Although, in general, all of the time cells within the time cell array would be initialized at the same time, it is possible to divide the time cell array into subsets of time cells so that multiple elapsed time periods are being measured.

Figure 3B:
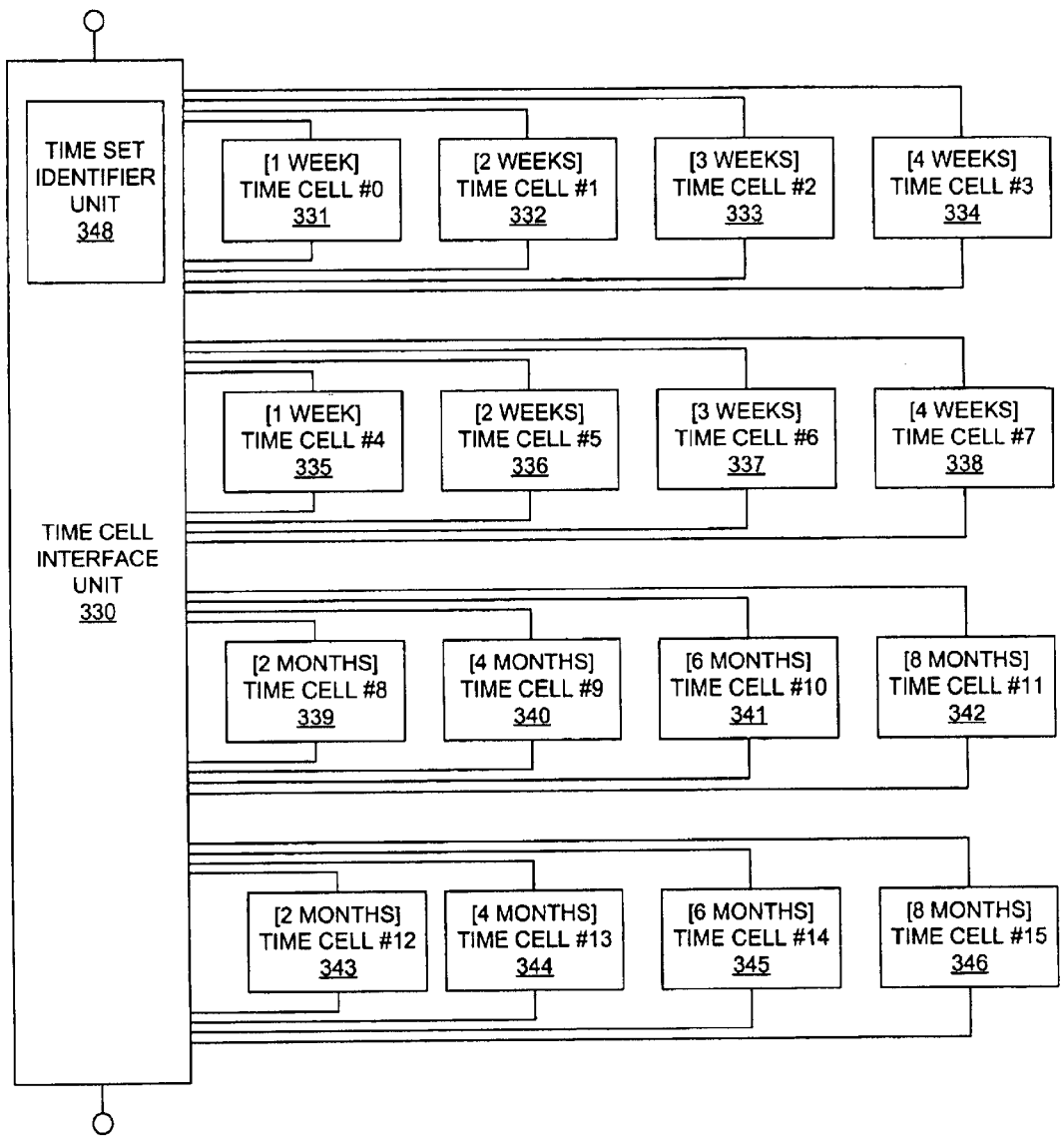
FIG. 3B depicts an array of time cells divided into sets of time cells.

With reference now to FIG. 3B, a block diagram depicts an array of time cells divided into sets of time cells in accordance with an embodiment of the present invention. FIG. 3B shows a set of sixteen time cells similar to those shown in FIG. 3A. Time cell interface unit 330 provides the necessary, simple circuitry for addressing time cells 331–346.

The time cells can be arranged as M×N arrays of different sizes. For example, one could divide a time cell array containing sixteen time cells into four sets of four time cells, and the four sets could be constructed such that each set measured different periods of time.

In the example shown in FIG. 3B, time cells 331–334 form a single set in which the set collectively measures a four-week time period in one-week increments. Time cells 335–338 also form a set of time cells in which the set measures a four-week time period in one-week increments. Time cells 339–342 and time cells 343–346 form two sets in which each set collectively measures an eight-month time period in two-month increments.

Each set of four time cells may be initialized by different data processing systems for different purposes at different starting times. The time cell array may monitor a maximum of four different time periods, or four different "time sets", whereas, in general, the maximum number of time sets would depend on the number of time cells in the time cell array and the manner in which the time cells are constructed to measure different time periods. For this type of functionality, time cell interface unit 330 may have other non-volatile memory cells, such as time set identifier unit 348, for storing use indicators that show whether a particular time set is already in use and for storing information that identifies the data processing system that "owns" a particular time set.

Timestamps may also be associatively stored in the non-volatile memory cells in the time set identifier unit so that a sensing device may read the time at which the time set was initialized or initiated. The time set identifier unit may also supply information to the programming request processing unit concerning the time sets available for request.

Figure 3C:
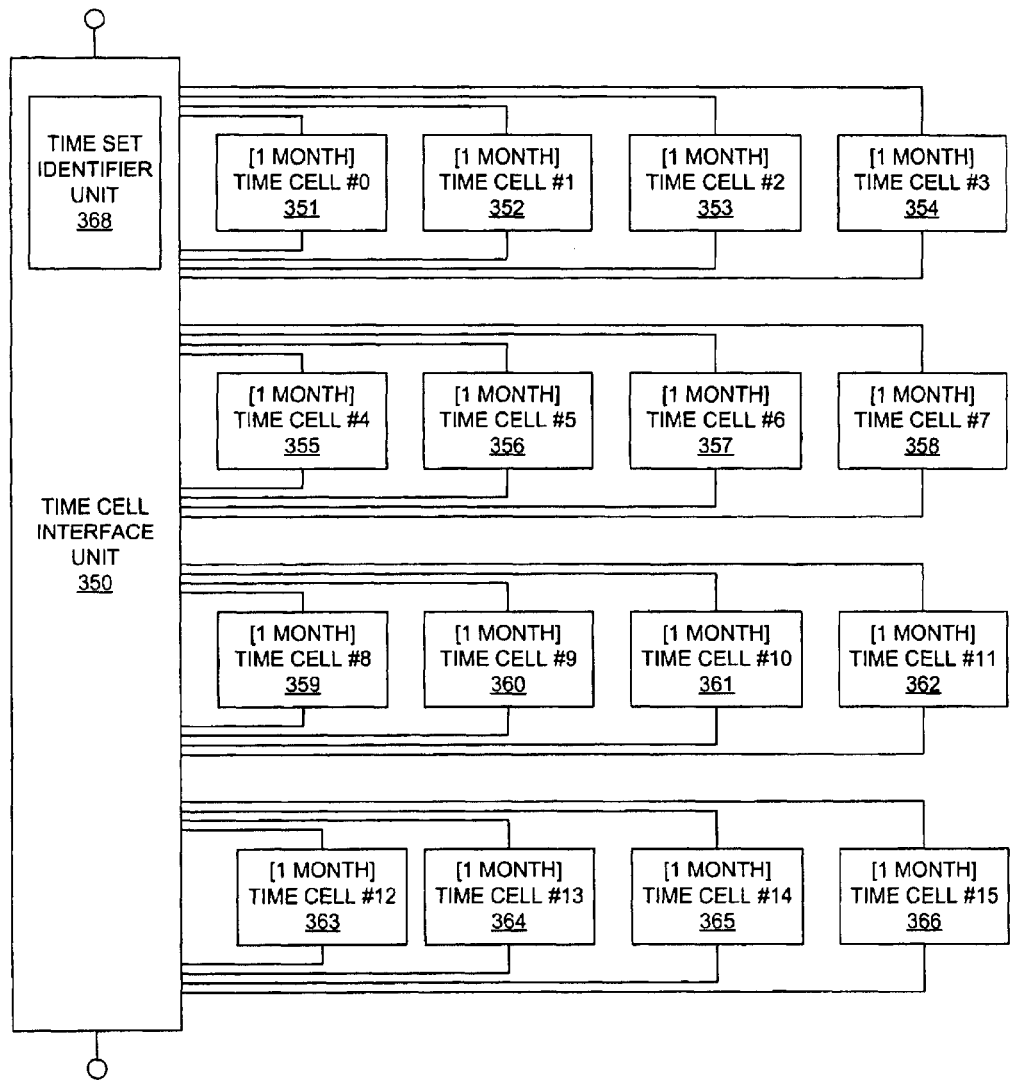
FIG. 3C depicts an array of time cells for measuring multiple time periods.

With reference now to FIG. 3C, a block diagram depicts an array of time cells for measuring multiple time periods in accordance with an embodiment of the present invention. FIG. 3C shows a set of sixteen time cells similar to those shown in FIG. 3A. Time cell interface unit 350 provides the necessary circuitry for addressing time cells 351–366. In this example, all of the time cells have identical associated time periods, and a device that contains the time cell array may monitor sixteen concurrently running time periods with different starting times. Again, it should be noted that the time periods associated with a time cell may be set through the construction of the time cell, which gives the time cell its particular physical characteristics, or through the programming period for the time cell, which gives the time cell its electrostatic charge that serves as an initial condition for the time cell's discharge function.

Time set identifier unit 368 may store: use indicators that show whether a particular time cell is already in use; identification information of the data processing system that "owns" a particular time cell; a timestamp associated with the time cell indicating the time at which the time cell's elapsed time period was initiated; and any other information which may be pertinent to the operation of a time cell array and its use.

The time cell array shown in FIG. 3C may also be used in the following manner. The time set identifier unit may set aside time cells 351–354 to monitor a single six-month time period for a single requested time period or time set. Rather than using a single time cell for a requested time period, multiple time cells are used. When a time request is received, the readings from time cells 351–354 are statistically combined to form a determination as to whether the time period has elapsed. For example, a six-month time period is not determined to have elapsed until there are at least two expired time cells. In this manner, the time cells may be viewed as providing a type of redundancy or error-checking in their elapsed time measuring capabilities. Of course, the number of time cells that are used as a redundant set and the number of time cells that are required for a positive determination of an elapsed time may vary.

The redundant use of time cells may also be used in more complex ways. Referring again to FIG. 3B, time cells 335–338 may act as a backup set or error-checking set to time cells 331–338. Each of these sets of time cells can measure a four-week time period in one-week increments, so the time set identifier unit may require that each set of time cells show a minimum elapsed time period before that time period is confirmed. For example, assuming again that the time cell array is read such that the least significant time bit represents the time cell with the shortest time period, the time set identifier unit might require a reading of 0xC from each set of time cells before positively reporting that a two-week time period has elapsed since the two set of time cells were initialized or programmed.

Figure 3D:
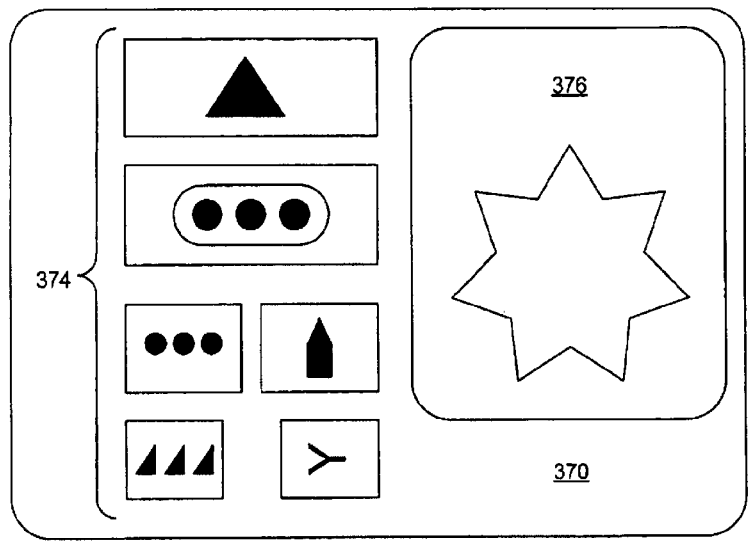
FIG. 3D is a graphical depiction of a smart card that may be used in conjunction with the present invention.

With reference now to FIG. 3D, a graphical depiction is provided for a smart card that may be used in conjunction with the present invention. Smart card 370 includes input control buttons 374, and electronic display 376. Buttons 374 may be used by a purchaser or owner of the smart card for inputting and selecting specific functions provided by an application operating on the smart card.

Display 376 presents information to the user of the smart card generated by applications within the smart card, possibly in conjunction with a device or data processing system to which the smart card is coupled or in which the smart card is inserted. Alternatively, smart card 370 does not have a display, but a user may operate a reader device that couples to the smart card and interacts with the smart card, and the user can view optional functions and selections on the display of the reader device. In either case, a user can be provided with textual and/or graphical indicators on the display of a device that indicate the status of one or more time cells on the physical token containing the time cells.

Figure 3E:
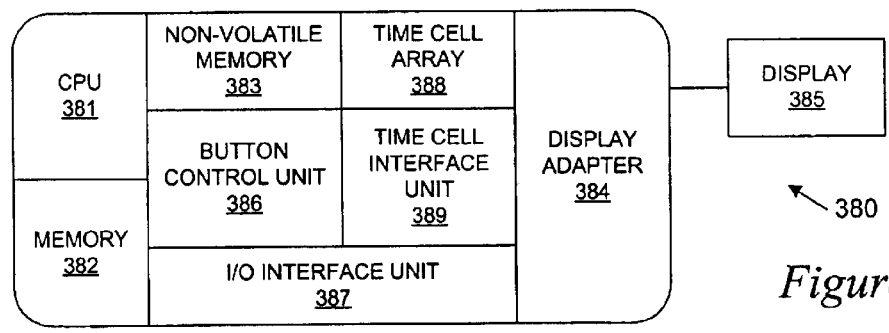
FIG. 3E depicts the hardware components within a smart card that may be used in conjunction with a time cell array of the present invention.

With reference now to FIG. 3E, a block diagram depicts the hardware components within a smart card that may be used in conjunction with a time cell array of the present invention. Smart card 380 shows the typical internal hardware components of a smart card, such as smart card 370 shown in FIG. 3D. Smart card 380 contains a CPU 381 that provides processing capabilities to various applications located on smart card 380. Memory 382 provides temporary storage for the loading and processing of data. Non-volatile memory 383 provides permanent storage for applications and their related databases. Display adapter 384 generates presentation data to be shown on display 385. Button control unit 386 reads and processes user selections of buttons on the physical interface of smart card 380. I/O interface unit 387 allows smart card 380 to interface with various card readers, scanners, modems, or other computer or network-related items.

Button control unit 386 allows a user to input various selections and data to applications on smart card 380. Additional input devices may be included with or interfaced to smart card 380. Display 385 may be physically integrated with smart card 380, although other display units may be connected to smart card 380. Non-volatile memory 383 may include a variety of storage devices and capabilities, such as read-only memory, flash ROM, or an IBM MicroDrive, a product of International Business Machines Corporation, located in Armonk, N.Y. Smart card 380 may also include a Java Virtual Machine capable of running Java applications and applets. Those of ordinary skill of the art will appreciate that the hardware in FIG. 3E may vary depending on various implementation considerations. For example, it should be noted that the electronics within smart card 380 may be implemented on a single chip. In addition, other types of physical tokens could be used in place of a smart card, such as a PCMCIA card, flash memory cards, and various types of articles of manufacture.

Smart card 370 or smart card 380 also contains a batteryless, oscillatorless horological device in accordance with the present invention. Time cell array 388 is controlled by time cell interface unit 389 for measuring time periods in a manner similar to one or more methods that were described above with respect to FIGS. 3A–3C. Alternatively, the smart card may contain a single time cell. The complexity of the timekeeping requirements for the smart card applications may determine the type of time cell configuration for one or more application-specific purposes.

Smart card 380 may be coupled to a device which contains a programming request processing unit and a time detection unit, or smart card 380 may be coupled to separate devices at different times.

Figure 3F:
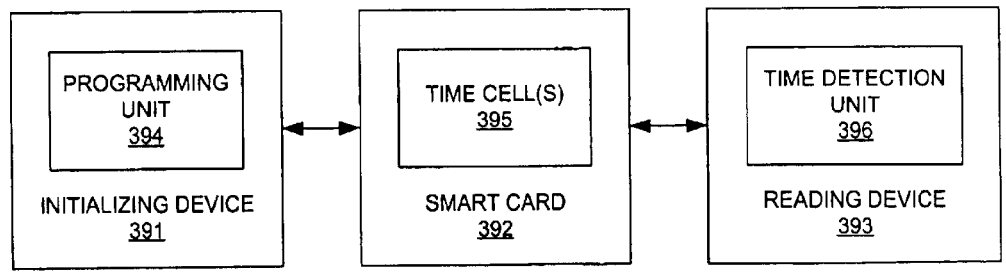
FIG. 3F depicts a relationship between a programming device, a sensing device, and an horological device in accordance with an embodiment of the present invention.

With reference now to FIG. 3F, a block diagram depicts a relationship between a programming device, a sensing device, and an horological device in accordance with an embodiment of the present invention. The horological device contains one or more time cells similar to that described above with respect to FIGS. 3A–3C.

System 390 shows initializing device 391 connected to batteryless, oscillatorless, electronic smart card device 392, which in turn is connected to reading device 393. While it is possible that all of these devices are located within the same system, depending upon the application, each of these devices may be physically located within a different system, product, component, or other device, all of which may be networked together in some manner. For example, the batteryless smart card may be initialized by an issuing institution using initializing device 391. A consumer may carry the smart card while it is monitoring an elapsed time period and then may present the smart card to a merchant. A merchant's data processing system that contains reading device 393 may then determine the smart card's elapsed time period for a variety of business reasons.

Much of the programming device circuitry and reading device circuitry may be implemented on smart card 392. However, additional circuitry adds to the cost of manufacture of the smart card, and there may be other commercial considerations. Although the smart card may contain this additional circuitry, it should be understood that the time cell is still directed to powerless or batteryless operation. For example, the smart card could contain a programming or initializing circuit, one or more time cells, and a reading or sensing circuit, in which case the programming and sensing circuits draw electricity from a power source external to the smart card.

Initializing device 391 contains programming unit 394 which receives programming commands and sends status about the programming operations (not shown). Programming unit 394 controls the programming operation of time cells 395. Once the programming operation is complete, the time cell discharges its stored charge over time.

At a subsequent point in time, smart card 392 is coupled to reading device 393, in which time detection unit 396 determines the current threshold voltage(s) of the time cell(s), as was described above, and returns the elapsed time corresponding to the current threshold voltage in some manner or returned to the requester.

An Horological Device with an Expanded Floating Gate that is Common to a Programming FGFET and Chargeloss-sensing FGFET A fourth embodiment of the present invention extends the concept of using the floating gate of a floating gate field effect transistor (FGFET) as the insulated charge storage element for an horological device in accordance with the present invention. Preferably, a programming FGFET and a chargeloss-sensing FGFET have a common, expanded floating gate. The programming FGFET is used to program the common floating gate with an amount of electrostatic charge that is greater than the amount of electrostatic charge stored by a typical FGFET. At selected points in time, the electric potential of the floating gate is then indirectly determined by a charge loss sensing device with the assistance of the chargeloss-sensing FGFET, and the measurement is converted into an elapsed time value. In effect, the chargeloss-sensing FGFET senses the amount of stored electrostatic charge that is lost over a period of time by the device. The device for this embodiment may be termed a programmable chargeloss-sensing (PCS) floating gate field effect transistor, or simply PCSFET.

In general, the operation of a PCSFET is similar to the operation of a time cell whose form is based on a non-volatile memory cell. As previously described above, the associated, measurable, time period for this type of time cell has expired if it contains a logical "0" at some point after it has been programmed. The binary determination of whether or not the time cell has expired provides a basis for calling this type of time cell a "binary time cell". In contrast, the operation of the PCSFET results in an analog measurement of its state when an elapsed time is to be observed, as described in more detail further below. Although the final, outputted, time value may be in digital form, the state of the PCSFET is initially sensed in an analog manner. For this reason, the PCSFET may be termed an "analog time cell".

Figure 4A:
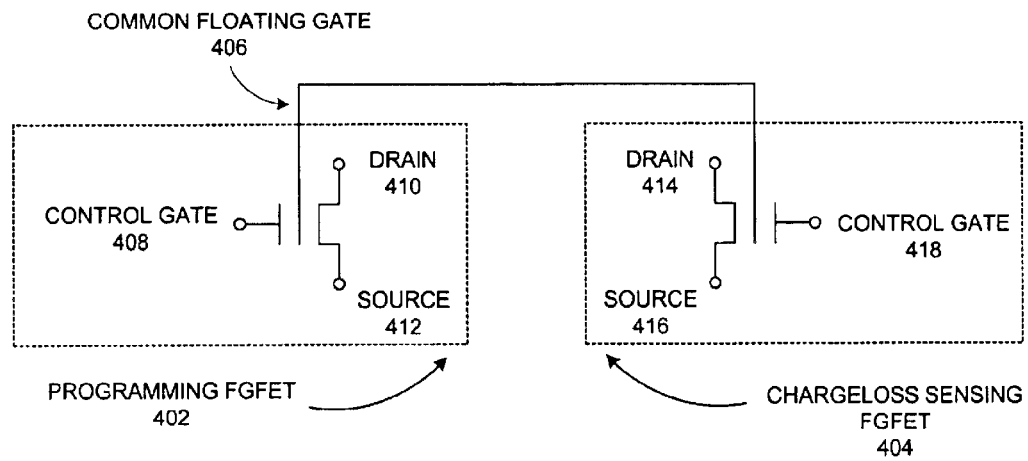
FIGS. 4A–4B are symbolic representations of an embodiment of the present invention that show a programming FGFET and a chargeloss-sensing FGFET together with a common floating gate.
Figure 4B:
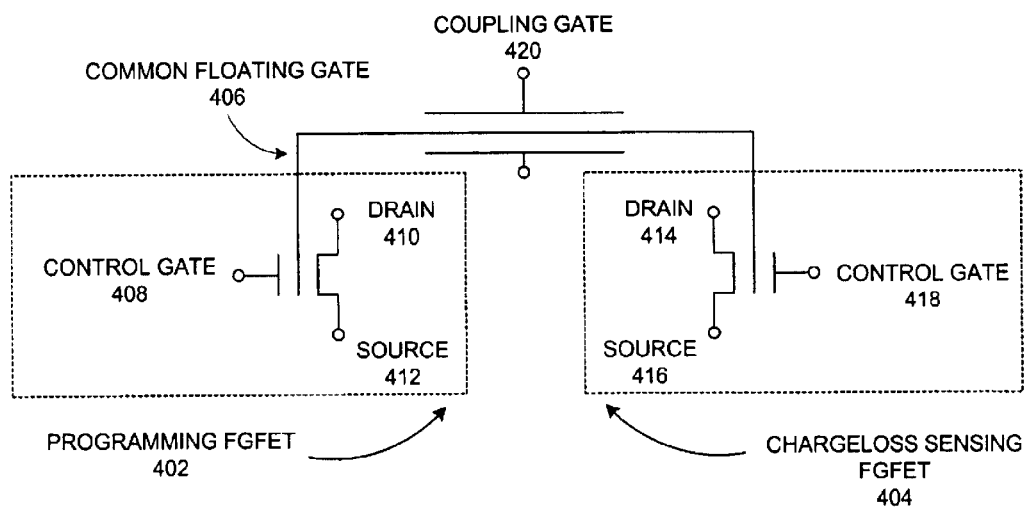

With reference now to FIGS. 4A–4B, symbolic representations of the horological device of the fourth embodiment of the present invention is shown as a programming FGFET and a chargeloss-sensing FGFET together with a common floating gate. In FIG. 4A, programming FGFET 402 is "coupled" to chargeloss-sensing FGFET 404 (also simply termed "sensing FGFET") through common floating gate 406. Programming FGFET 402 has control gate 408, drain 410, and source 412, while sensing FGFET 404 has drain 414, source 416, and control gate 418. Common floating gate 406, though, acts as a floating gate for both FGFETS; programming FGFET 402 stores an electrostatic charge into common floating gate 406, and sensing FGFET 404 indirectly determines the amount of electrostatic charge retained in floating gate 406 at a later point in time after the programming operation.

FIG. 4B is similar to FIG. 4A except that FIG. 4B depicts a preferred embodiment in which an additional element is added to the circuit. Coupling gate 420 assists in storing a larger amount of charge onto the common floating gate than would otherwise be possible without coupling gate 420, as is explained in more detail below.

In order to store charge in the common floating gate, the floating gate must be programmed. During the programming operation, only the programming FGFET is used. The chargeloss-sensing FGFET remains idle, and the voltages at its source, drain, and control gate are allowed to float or are tied to ground. Preferably, the programming mechanism is channel hot electron injection through the programming FGFET by tying its source to ground and its control gate and drain to sufficiently high voltages.

In this embodiment, the common floating gate is employed to accumulate a larger amount of charge than may be stored by a typical FGFET. A larger amount of stored charge provides two benefits. First, the common floating gate will require a longer period of time to discharge a larger amount of stored charge. Hence, a longer elapsed time period can be monitored when the device is in its time monitoring mode of operation.

Second, the larger initial charge increases the initial condition for the charge decay function, in a manner similar to that described above with respect to FIGS. 1L–1Q. The larger initial charge causes the chargeloss-sensing FGFET to have a higher initial threshold voltage, which shifts the decay or discharge function rightward when viewed in a threshold voltage decay chart. This allows a designer to pick the range of threshold voltages over which the PCSFET device will operate during the elapsed time period. One reason that this is important is because the circuitry containing the PCSFET operates within certain voltages, and the operational threshold voltages of the PCSFET can be brought into a range of voltage values that simplifies the design or operation of the surrounding circuitry.

However, during the programming operation, as the charge accumulates in the floating gate, the accumulating charge repels an increasing number of electrons that are being emitting into the tunneling oxide of the programming FGFET; the electrons are repelled back into the channel. In this scenario, the electric potential of the floating gate would be limited to a value that is lower than desired.

In order to store more charge in the common floating gate, an appropriate voltage is applied to the coupling gate. The coupling gate induces an electric field through the common floating gate, giving the floating gate a larger capacitance, i.e. a larger ability to store charge. The configurations of the coupling gate, the common floating gate, and other regions are described in more detail with respect to FIG. 4F.

Figure 4C:
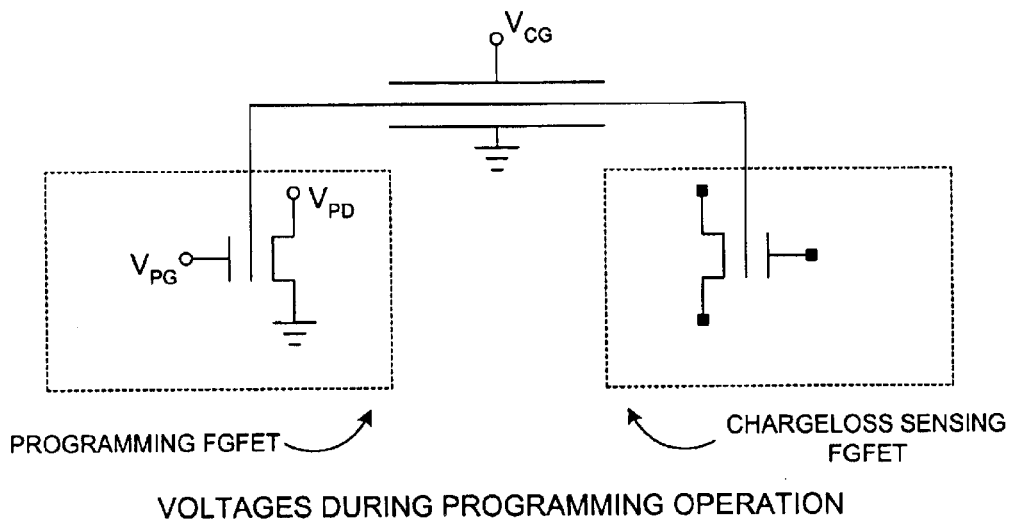
FIG. 4C depicts the voltages applied to the various terminals of the device during the programming operation.

With reference now to FIG. 4C, a diagram depicts the voltages applied to the various terminals of the device during the programming operation.

To induce CHE injection within the programming FGFET during the programming process, a high positive voltage is applied at the drain of the programming FGFET, herein termed $V_{PD}$. Because electrons are being injected into the floating gate, a high positive voltage, herein termed $V_{CG}$, is applied to the coupling gate to attract more injected electrons into or onto the floating gate, thus allowing the floating gate to reach a higher potential than without the coupling gate. The coupling gate voltage $V_{CG}$ is slightly higher than $V_{PD}$ so that the voltage of the floating gate approaches a higher value during the programming process.

The source of the programming FGFET is tied to ground while its control gate receives a voltage $V_{PG}$, which may be substantially the same voltage as $V_{PD}$. The terminals of the sensing FGFET are unbiased and allowed to float.

Figure 4D:
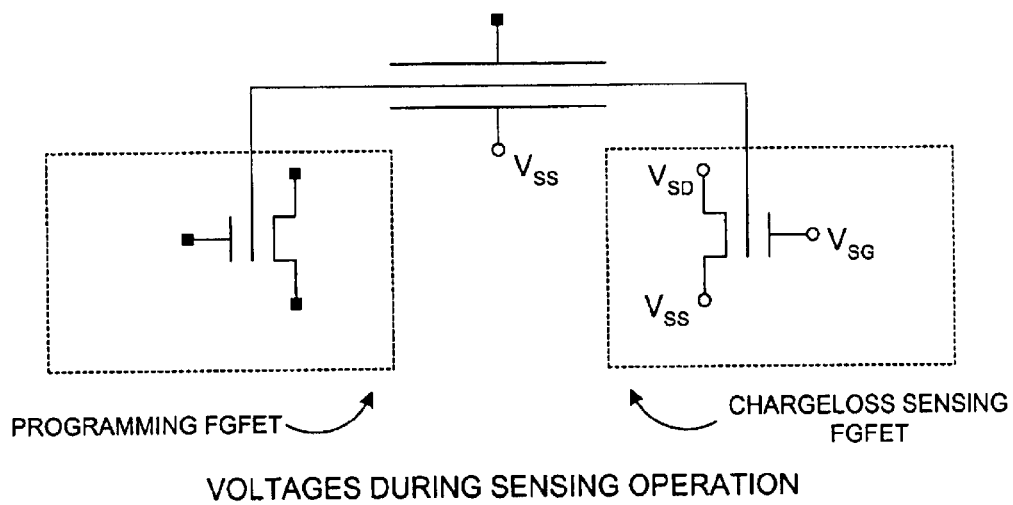
FIG. 4D depicts the voltages applied to the various terminals during a sensing operation for a device in accordance with an embodiment of the present invention.

With reference now to FIG. 4D, a diagram depicts the voltages applied to the various terminals during a sensing operation for a device in accordance with an embodiment of the present invention. The manner in which an elapsed time period is determined for a programmed device in this embodiment is significantly different than the time detection operations that are described above for other embodiments. In this embodiment, the time detection operation comprises a threshold voltage sensing operation in which the retained electric potential of the retained electrostatic charge on the floating gate is indirectly determined or "sensed" through the chargeloss-sensing FGFET. FIG. 4D shows the voltages that are applied to the device during the sensing operation. The source, control gate, and drain of the sensing FGFET are biased with voltages $V_{SS}$, $V_{SG}$, and $V_{SD}$, respectively, in a manner which allows for the sensing operation, as is described in more detail below. The upper contact of the coupling gate is unbiased and allowed to float, whereas the lower portion of the coupling gate is biased at the same voltage as the source of the chargeloss-sensing FGFET, which is shown as $V_{SS}$ in FIG. 4D. The terminals of the programming FGFET are unbiased and allowed to float.

Figure 4E:
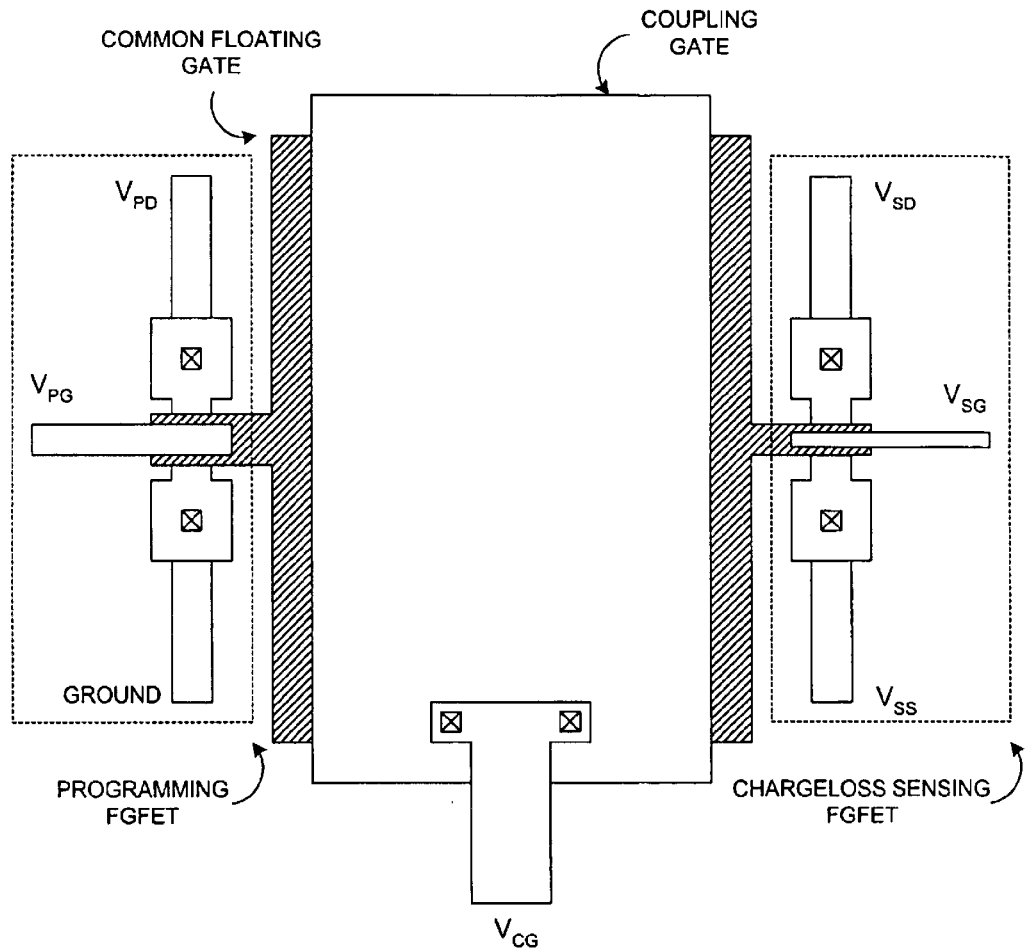
FIG. 4E depicts a physical device comprising a programming FGFET coupled through a common floating gate with a chargeloss-sensing FGFET in combination with a coupling gate in accordance with an embodiment of the present invention.

With reference now to FIG. 4E, a diagram depicts a physical device comprising a programming FGFET coupled through a common floating gate with a chargeloss-sensing FGFET in combination with a coupling gate in accordance with an embodiment of the present invention. FIG. 4B shows a top view of a physical PCSFET device. FIG. 4E also shows most of the voltages that are applied to the device both during a programming operation and a sensing operation, although these voltages are not necessarily applied simultaneously or concurrently, as described above with respect to FIG. 4C and FIG. 4D.

As shown in FIG. 4E, a portion of the common floating gate is placed vertically between the control gate and channel of the programming FGFET and also vertically between the control gate and channel of the sensing FGFET. A cross-sectional view of either the programming FGFET or the chargeloss-sensing FGFET would appear similar to the FGFET shown in FIG. 1A, although the common floating gate in the PCSFET obviously extends between the programming FGFET and the chargeloss-sensing FGFET.

Because of this configuration, the programming FGFET and the sensing FGFET both have a tunneling region through which trapped electrostatic charge in a programmed common floating gate can be discharged through Fowler-Nordheim tunneling. As previously described, the physical properties and dimensions of the tunneling region may be constructed to control the rate of discharge from the common floating gate. The overall discharge function of the PCSFET is then equal to the sum of the discharge functions of both the programming FGFET and the chargeloss-sensing FGFET. However, depending on the dimensions and properties of these tunneling regions, one of the tunneling regions may be purposefully considered to be more dominant than the other region.

Alternatively, the regions between the common floating gate and the channels in the programming and chargeloss-sensing FGFETs may be constructed so that Fowler-Nordheim tunneling in these regions is negligible over the time period of interest. Instead, the PCSFET may have one or more dominant tunneling regions adjacent to the common floating gate. As described previously, a dominant tunneling region may be constructed with more precision than other elements in the device in order to achieve an actual device that closely adheres to its theoretical model, thereby enabling more precise time measurements to be made during the time period of interest.

As further examples of some of the physical properties that may be controlled to obtain the desired operational characteristics of a time cell, one may modify, either singly or in combination, the aspects of the floating gate and/or the other elements of a floating gate FET. The amount of charge that may be stored by the floating gate can be roughly formulated as:

$$C = e_{OX} * A / t_{OX}$$

where C is the amount of charge, A is the area of the floating gate, $e_{OX}$ is the dielectric constant of the insulating material (e.g., oxide), and $t_{OX}$ is the thickness of the oxide or other insulating material. To vary the amount of initial charge in or on the floating gate, one can vary each of these parameters and/or the initial charge/programming time. It should be noted that varying these parameters may require changes in the fabrication process that is used to create the device.

One can also control other physical aspects of the field effect transistor. One can vary the channel length and width, each of which effect the tunneling area. For example, a wide, long device has more tunneling area, thereby changing the rate of the discharge process. It should be noted that the threshold voltage for a long channel device can be substantially higher, however. For a narrow channel device, the threshold increases or decreases depending upon the fabrication technique (in other words, this is a second order effect).

For other variations, fabrication process changes may be required. Again, a thin oxide allows for faster tunneling and lowers the threshold. A higher dielectric constant also lowers the threshold voltage of the device. Thermal oxide grown on poly (polyoxides) permits tunneling at thicker oxides at higher rates than those oxides grown thermally on monocrystalline silicon.

In FIG. 4E, the portion of the common floating gate within the programming FGFET is slightly larger than the portion of the common floating gate within the chargeloss-sensing FGFET. Depending on the implementation of the device, the sizes of these portions may be equal or may vary.

Figure 4F:
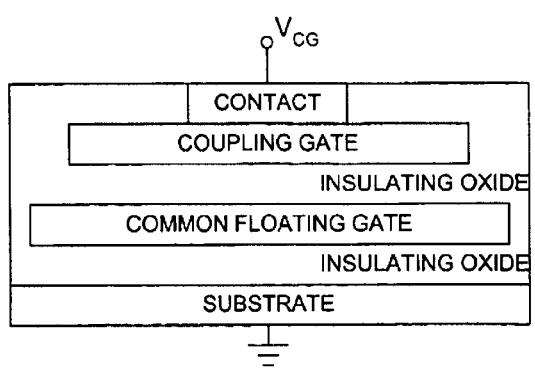
FIG. 4F is a simplified cross-sectional view that shows the positional relationships of the common floating gate and the coupling gate of a programmable chargeloss-sensing FGFET in accordance with an embodiment of the present invention.

With reference now to FIG. 4F, a simplified cross-sectional view shows the positional relationships of the common floating gate and the coupling gate of a programmable chargeloss-sensing FGFET in accordance with an embodiment of the present invention. The device is not necessarily drawn to scale, and the insulating material, shown as an oxide, may comprise one or more different materials deposited or formed in multiple fabrication steps.

The common floating gate is preferably composed of polysilicon. The common floating gate is preferably completely insulated by an appropriate material, such as silicon oxide. The coupling gate is composed of an appropriate material, such as metal or polysilicon.

The size of the common floating gate is a design choice that depends on the amount of charge that one desires to store, which is obviously influenced by the discharge function that one desires for a particular time measurement period.

The magnitude of $V_{CG}$ on the coupling gate depends upon the amount of charge that one desires to store on the floating gate. The substrate region below the coupling gate and below the floating gate is grounded or appropriately biased with respect to the coupling gate.

Preferably, the thickness of the oxide between the common floating gate and the coupling gate is much larger than the oxide thickness in the tunneling regions of the programming FGFET and the chargeloss-sensing FGFET. This preference is to ensure that the stored charge is lost mainly through Fowler-Nordheim tunneling in the tunneling regions of the programming FGFET and the chargeloss-sensing FGFET and not through tunneling to the coupling gate.

As shown in previous figures, the thickness of the tunneling oxide may vary depending upon the elapsed time period that one desires to measure or depending upon the discharge function that one desires during the elapsed time period. However, the thickness of the oxide between the common floating gate and the coupling gate and between the common floating gate and the substrate is preferably larger than 9 nm to ensure that the charge loss through these oxide regions is negligible over long periods of time.

It should be noted that there is a tradeoff, though, for a thicker oxide in these regions. While a thicker oxide reduces charge loss, it also reduces the capacitive coupling effect of the coupling gate. A larger distance between the coupling gate and the substrate reduces the electric potential between these two regions, thereby diminishing the strength of the electric field on the common floating gate situated between the coupling gate and the substrate. It should also be noted that the oxide between the coupling gate and the common floating gate does not necessarily have the same dimensions as the oxide between the common floating gate and the substrate.

After the programming operation, the stored electrostatic charge in the common floating gate will begin to tunnel through the tunneling regions in both the programming FGFET and the sensing FGFET, the effects of which can be simply added together. As shown with respect to previous figures, the consequences of the charge loss on the threshold voltage of a device can be modeled. Hence, the effect of the charge loss on the threshold voltage of the sensing FGFET can be used to determine an elapsed time period since the common floating gate was programmed.

However, as noted previously, the manner in which the elapsed time period is determined for this embodiment of the present invention is different from the manner described above with respect to non-volatile memory cells that are configured as time cells in accordance with other embodiments of the present invention. From one perspective, the device in this embodiment operates in a similar manner to the previously described time cells; a type of floating gate FET is programmed, and the charge in the floating gate is allowed to dissipate in a discharge process through the insulating material over a period of time. In the time cells in the previous embodiments, though, a simple read operation suffices to determine whether the measured time period has reached a predetermined elapsed time; those time cells can be termed "binary time cells". In contrast, the present embodiment uses a threshold voltage detection circuit to determine the threshold voltage of the sensing FGFET; the time cells in this embodiment can be termed "analog time cells".

Figure 4G:
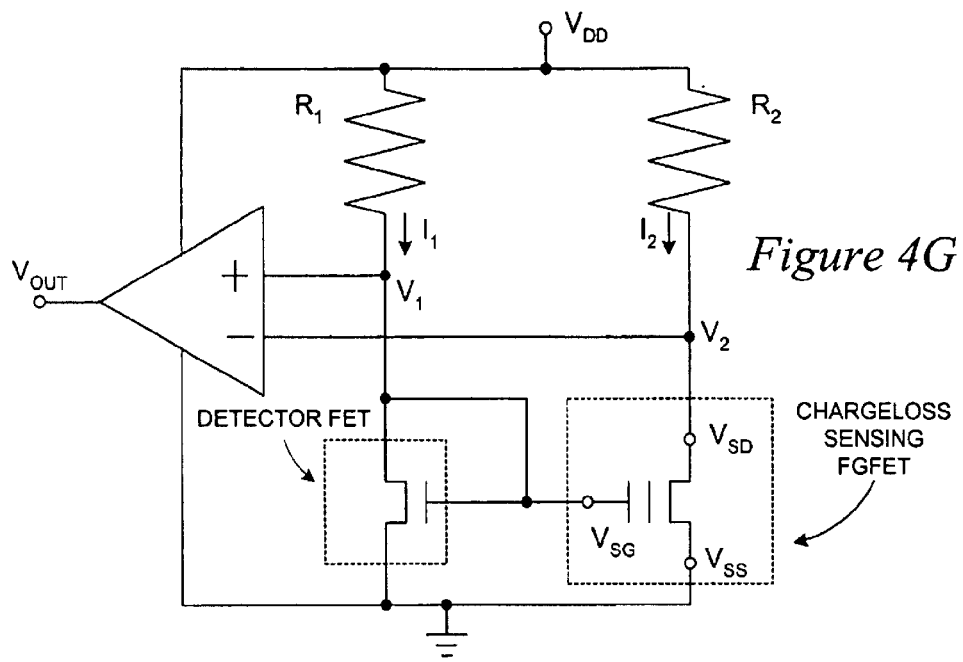
FIG. 4G is a circuit diagram that depicts a threshold voltage detection circuit in accordance with an embodiment of the present invention.

With reference now to FIG. 4G, a circuit diagram depicts a threshold voltage detection circuit in accordance with an embodiment of the present invention. The complete threshold voltage detection circuit comprises the PCSFET. Only the chargeloss-sensing FGFET is shown in FIG. 4G; the terminals of the programming FGFET in the PCSFET are allowed to float during the sensing operation, and the terminals on the programming FGFET do not affect the operation of the threshold voltage detection circuit during the sensing operation.

The device described with respect to FIGS. 4A–4F can monitor an elapsed time period without an external power source. However, an external power source and additional circuitry are required to perform the programming operation, which was described above with respect to FIG. 4C, and to perform the sensing operation. For this embodiment of the present invention, the sensing operation employs the threshold voltage detection circuit shown in FIG. 4G, which could be located on a sensing device that contains a power source. Alternatively, the sensing circuit could be located on the same device as the PCSFET and then later coupled to another device with a power supply. In other words, the terminals for coupling with an external device may be placed in an appropriate location that may depend on the application being supported by the horological device.

The threshold voltage detection circuit in FIG. 4G shows the chargeloss-sensing FGFET of the PCSFET, a detector FET, two resistors, and an operational amplifier that is operated as a generic inverting sum amplifier. The detector FET has been constructed so that it has operational characteristics that are nearly identical to those of the chargeloss-sensing FGFET when the chargeloss-sensing FGFET is not charged. In other words, the detector FET and the chargeloss-sensing FGFET are matched such that they have nearly identical threshold voltage curves over the same range of inputs. The resistances $R_1$ and $R_2$ are also equal.

The chargeloss-sensing FGFET can have basically two states of operation: (1) the common floating gate has not been programmed; and (2) the common floating gate has been programmed. First, the operation of the threshold-voltage detection circuit in the non-programmed mode is described, and then the programmed mode of operation is described.

The inputs to the gate and drain of the detector FET are shorted, so the source-to-drain voltage and the source-to-gate voltage of the detector FET are equal, which places the detector FET into saturation mode and causes the detector FET to act as a constant current source. Since $I_1$ is constant, the drop in potential across $R_1$ is constant, and $V_1$ remains at a constant value between ground and $V_{DD}$. $R_1$ and $R_2$ can be chosen so that $V_1$ is any value less than $V_{DD}$, i.e. $V_1<V_{DD}$.

When the PCSFET is not charged, the chargeloss-sensing FGFET is in a steady state. The control gate of the chargeloss-sensing FGFET is at the same potential as the gate of the detector FET, and because the two transistors are matched, the current through the chargeloss-sensing FGFET is equal to the current through the detector FET, i.e. $I_2$ equals $I_1$. Hence, $V_2$ equals $V_1$ since $R_2$ equals $R_1$, and $V_2$ is also less than $V_{DD}$, i.e. $V_2<V_{DD}$.

The operational amplifier is operated in a mode that allows it to act as a generic inverting sum amplifier; the feedback network through the rest of the circuitry is not represented in the diagram. Hence, the circuit operates in a manner such that when its two inputs are equal, then $V_{OUT}$ is approximately equal to $V_{DD}$, and when its inverting input terminal is much larger than the non-inverting input terminal, then the output voltage is close to zero. In other words, the circuit operates with the following approximate relationship:

$V_{OUT} \approx V_{DD}+B^*(V_1-V_2)$, $V_{OUT}>0$. $V_{OUT}$ is limited to positive voltages, and B is a gain variable or constant.

When the PCSFET is discharged, the chargeloss-sensing FGFET is at equilibrium, and $V_1=V_2$. Hence, $V_{OUT} \approx V_{DD}$ in the non-programmed mode of operation.

Once the analog time cell has been programmed, it can be regarded as having entered a programmed mode of operation. As previously described, after the programming process, the amount of stored charge in the common floating gate is decreasing through Fowler-Nordheim tunneling, which causes the threshold voltage of the chargeloss-sensing FGFET to diminish over time.

Immediately after the common floating gate has been programmed, though, the threshold voltage of the chargeloss-sensing FGFET is at a maximum value. Since the source-to-gate voltage, i.e. control gate voltage, is constant and equal to $V_1$, the chargeloss-sensing FGFET is no longer turned on for this control gate voltage. The current $I_2$ drops as the threshold voltage of the chargeloss-sensing FGFET rises, i.e. its source-to-drain voltage rises. Since $I_2$ is very small, there is very little potential drop across $R_2$, and $V_2$ is approximately equal to $V_{DD}$. Referring again to the voltage relation:

$V_{OUT} \approx V_{DD}+B^*(V_1-V_2)$, $V_{OUT}>0$.

Since $V_1$ is somewhat less than $V_{DD}$ and $V_2$ is approximately equal to $V_{DD}$, $V_{OUT}$ would evaluate to less than zero if the output were not referenced to ground for negative voltages. Hence, $V_{OUT}$ would be equal to zero just after programming the PCSFET. For the special case of B equal to two and $V_1$ equal to $V_{DD}/2$, $V_{OUT}$ evaluates to zero without being referenced to zero.

Figure 4H:
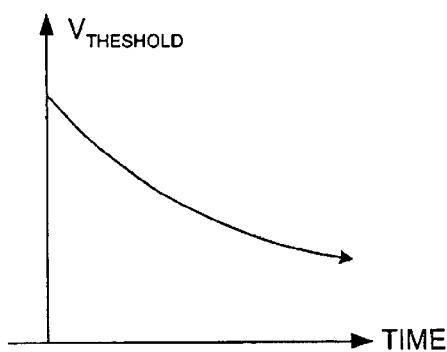
FIGS. 4H–4J are a set of graphs that show the manner in which the voltages and currents in the PCSFET change during a monitored time period.
Figure 4I:
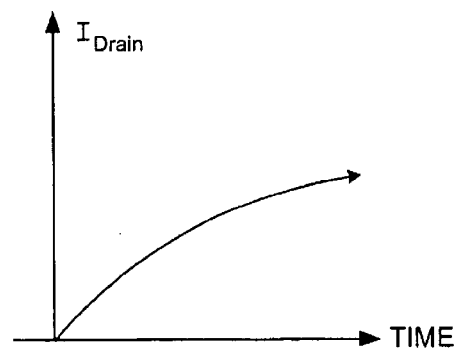
Figure 4J:
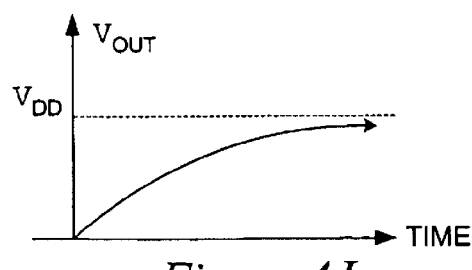

With reference now to FIGS. 4H–4J, a set of graphs show the manner in which the voltages and currents in the PCSFET change during a monitored time period.

As shown in FIG. 4H, after the common floating gate has been programmed, the threshold voltage of the chargeloss-sensing FGFET decreases as the common floating gate loses its charge. As shown in FIG. 4I, as the threshold voltage decreases, the drain current through the chargeloss-sensing FGFET increases. As $I_2$ increases, the potential drop across $R_2$ increases, and $V_2$ decreases. As shown in FIG. 4J, over a sufficiently long period of time, $V_2$ approaches $V_1$, and $V_{OUT}$ approaches $V_{DD}$.

In this manner, the sensing mechanism is designed for observing the threshold voltage of the chargeloss-sensing FGFET in an indirect manner. The output voltage $V_{OUT}$ is inversely related to the threshold voltage, although the threshold voltage is not measured directly. The sensing mechanism observes the state of the PCSFET at any desired point in time without disrupting the state of the PCSFET. The retained charge within the common floating gate is substantially undisturbed by the voltages applied to the chargeloss-sensing FGFET during the sensing process.

As should be apparent to one of ordinary skill in the art, the sensing circuit will have multiple design solutions for multiple input variables, which include: the threshold voltage to be measured, which is a function of the elapsed time to be measured, the charge to be stored, and the physical characteristics of the PCSFET; the matching characteristics of the detector FET and the chargeloss-sensing FGFET (gate-to-source voltage, source-to-drain voltage, current characteristics, etc.); the current through the chargeloss-sensing FGFET ($I_2$), and hence, one of the input voltages to the remainder of the circuit; the voltage to be held at the detector FET and the control gate of the chargeloss-sensing FGFET ($V_1$), and hence, the other input voltage to the remainder of the circuit. With appropriate design choices, the dependencies between the circuit elements can be chosen to obtain a desired voltage output function at $V_{OUT}$. Different sensing circuits may be used, and one of ordinary skill in the art would appreciate that the sensing mechanism may vary depending on the implementation of the present invention. The depicted examples are not meant to imply limitations with respect to the present invention but rather provide information concerning a preferred sensing mechanism in accordance with an embodiment of the present invention.

In order to convert the observed output voltage from the sensing circuit to an elapsed time value, the operational characteristics of the analog time cell must be known. As previously noted, in addition to manipulating the physical dimensions of the time cell, the operational characteristics of the time cell over an elapsed time period also depend on the time cell's initial conditions. The initial amount of charge stored in the common floating gate sets its initial electric potential, and the initial threshold voltage of the chargeloss-sensing FGFET varies with the initial amount of stored charge. Hence, it is also important that the programming operation be performed in a manner in which the common floating gate is initialized with an appropriate initial amount of electrostatic charge, or equivalently, in a manner in which the threshold voltage begins at an appropriate initial value.

For any desired initial starting condition for the analog-time cell, the common floating gate may be programmed for variable lengths of time. For example, to store more charge in the common floating gate, the programming operation is performed for a longer period of time. Different methods may be used to determine the specific length of programming time for a given analog time cell configuration.

As noted previously for binary time cells, the required length of programming time for any given analog time cell design or size may be found empirically by charging a test set of analog time cells. Each time cell in the set of time cells would be charged for a different length of time. Each time cell would then be monitored for its change in threshold voltage over a period of time. The initial programming times may then be correlated with the threshold voltage decay responses, and this information would be stored for later use. The testing procedures can also determine the tolerances of the manufactured devices. With this empirical information, a time cell with particular dimensions or physical characteristics could be employed to monitor a range of time periods that varies with its programming operation.

Alternatively, in order to provide the analog time cell with an accurate initial condition, the programming operation may employ the programming FGFET and the chargeloss-sensing FGFET in the following manner. As described previously, the programming process injects charge into the common floating gate via the programming FGFET. After the common floating gate has been charged for some period of time, the common floating gate might be expected to have reached its desired potential. In contrast to the previous description with respect to FIGS. 4C–4D, however, rather than leaving the chargeloss-sensing FGFET idle during the programming process, its terminals can be connected to a threshold voltage detection circuit. Instead of assuming that the programmed PCSFET has a particular initial threshold voltage in its chargeloss-sensing FGFET after the programming operation, the threshold voltage detection circuit is employed to measure the initial threshold voltage during the programming operation. If the threshold voltage has not yet reached its desired value, the programming process may continue. Assuming that the expected programming time is known fairly accurately, the programming process should only need to be continued for a relatively short amount of time after the programming operation has completed an initial programming phase.

The programming process may or may not be interrupted during the threshold voltage measurement process, and the measurement process may or may not be interrupted during the remainder of the programming process. Alternatively, the programming process and threshold voltage measurement process can cycle repeatedly until the proper initial threshold voltage is reached.

Other methods for determining the proper programming parameters may be employed without affecting the scope of the present invention.

To convert the observed output voltage from the sensing circuit to an elapsed time value, the operational characteristics of the analog time cell must be known, including the initial threshold voltage of the chargeloss-sensing FGFET and the threshold voltage decay function. The initial threshold voltage can be set during the programming operation, and although the analog time cell may be designed to respond with a particular threshold voltage decay function, the actual threshold voltage decay function can be found empirically. However, since a threshold voltage value at any particular time is found by observing the output of a threshold voltage detection circuit, the threshold voltage/time relationship provided by the threshold voltage decay function is essentially replaced by the output voltage/time relationship provided by the threshold voltage detection output function. The mathematical relationship between the threshold voltage detection output function and elapsed time is derived empirically and stored for later use.

In other words, once the operational characteristics of the analog time cell have been observed, a time measurement is essentially performed by mapping the output of the sensing circuit or sensing device with an elapsed time value. Referring again to FIG. 4G, the values of the voltage output function at $V_{OUT}$ are mapped to elapsed time values. The analog value of $V_{OUT}$ can be converted into a digital value by an A-D converter, which is used in some type of mapping function or mapping operation to obtain an elapsed time value.

Hence, for a given type of analog time cell, by having a converted digital datum from an indirect observation of the threshold voltage of the PCSFET and by knowing the initial threshold voltage of the PCSFET immediately after programming, an elapsed time value can be generated via a simple mapping operation, such as that provided by a simple lookup table.

In an alternative embodiment, the analog time cell can be paired with a non-volatile memory cell. If a device has multiple time cells, then each time cell can be paired with a non-volatile memory cell. When an analog time cell is programmed to an initial threshold voltage, the corresponding non-volatile memory cell can be programmed such that it also has the same initial threshold voltage. Since the corresponding non-volatile memory cell does not lose its initial charge over a time period of interest, the corresponding non-volatile memory cell can act as a reference. When a threshold voltage measurement operation is performed on the analog time cell, a similar threshold voltage measurement operation can be performed on the corresponding non-volatile memory cell. The measured threshold voltage from the non-volatile memory cell can then be used as a reference voltage for comparison against the measured threshold voltage from the analog time cell.

Figure 4K:
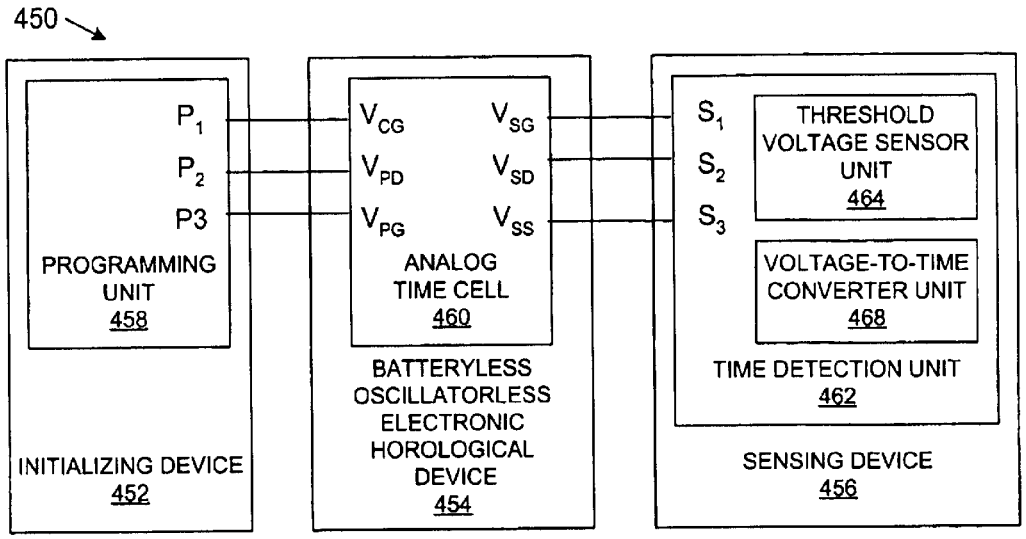
FIGS. 4K–4L is a block diagram that depicts a relationship between a programming device, a sensing device, and an horological device in accordance with an embodiment of the present invention.
Figure 4L:
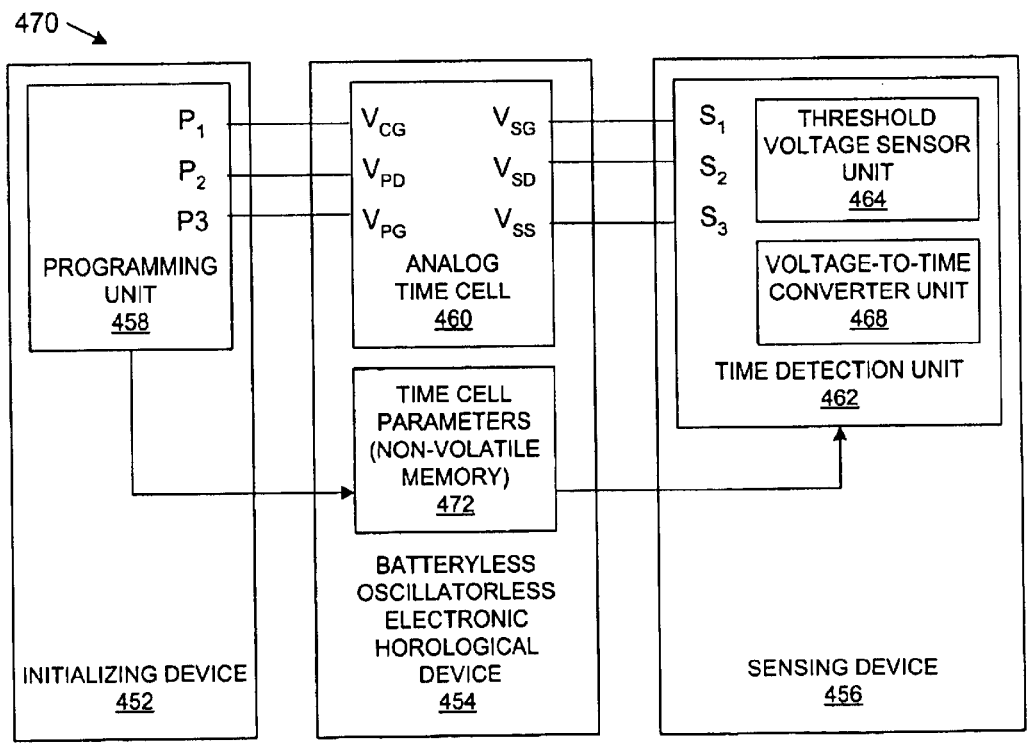

With reference now to FIGS. 4K–4L, a block diagram depicts a relationship between a programming device, a sensing device, and an horological device in accordance with an embodiment of the present invention. The horological device contains a PCSFET, i.e. an analog time cell, which is a combination of a programming FGFET and a sensing FGFET similar to that described above with respect to FIGS. 4A–4G.

System 450 shows initializing device 452 connected to batteryless, oscillatorless, electronic horological device 454, which in turn is connected to sensing device 456. While it is possible that all of these devices are located within the same system, depending upon the application, each of these devices may be physically located within a different system, product, component, or other device. For example, the horological device of the present invention may be located within a batteryless smart card that is initialized by an issuing institution using the initializing device. A consumer may carry the smart card while it is monitoring an elapsed time period and then may present the smart card to a merchant. A merchant's data processing system that contains a sensing device may then determine the smart card's elapsed time period for a variety of business reasons.

Much of the programming device circuitry and sensing device circuitry may be implemented on the portable device. This type of arrangement allows an accurate programming. operation in which a programming process and a measurement process are cycled, as described above. However, additional circuitry adds to the cost of manufacture of the smart card, and there may be other commercial considerations. Although the smart card may contain this additional circuitry, it should be understood that the time cell is still directed to powerless or batteryless operation, whether or not the smart card contains a battery.

Initializing device 452 contains programming unit 458 which receives programming commands and sends status about the programming operations (not shown). Programming unit 458 controls the programming operation by asserting programming voltages $P_1$, $P_2$, and $P_3$, which are received as voltages $V_{CG}$, $V_{PD}$, and $V_{PG}$ by analog time cell 460. The analog time cell contains a combination of a programming FGFET and a sensing FGFET with a common floating gate which receives a charge during the programming operation. Once the programming operation is complete, the analog time cell discharges its stored charge over time.

At a subsequent point in time, the horological device that contains analog time cell 460 is coupled to sensing device 456, which has voltages $S_1$, $S_2$, and $S_3$ that tie into the chargeloss-sensing FGFET terminals $V_{SG}$, $V_{SD}$, and $V_{SS}$. Sensing device 456 may then initiate the sensing operation or may wait for an elapsed time request command. As the charge in the floating gate of the time cell diminishes over time, the threshold voltage response of the sensing FGFET also diminishes. Time detection unit 462 controls threshold voltage sensor unit 464, which indirectly determines the current threshold voltage of the time cell, possibly using a threshold voltage detection circuit as was described above with respect to FIG. 4G. The estimated amount of elapsed time that corresponds to the determined threshold voltage is then computed by voltage-to-time converter unit 468, and the elapsed time is then processed in some manner or returned to the requester. A variety of forms may be used to report the elapsed time value, such as a timestamp, a number of elapsed seconds or other time units, or a simple boolean value indicating whether the elapsed time is greater than a selected time value.

FIG. 4L is similar to FIG. 4K. FIG. 4L shows system 470 that is similar to system 450 in FIG. 4K with identical reference numerals associated with identical elements. FIG. 4L also includes optional time cell parameter memory 472 on the horological device.

As described above with respect to FIG. 4G, the current state of the analog time cell must be mapped to an elapsed time when the time observation is made. In order to perform the computation properly, the voltage-to-time converter unit must have knowledge about the operational capabilities of the time cell, such as its decay or discharge function and the initial amount of charge stored into the common floating gate during the programming operation, or equivalently, the threshold voltage decay function and the initial threshold voltage. Since the amount of charge does not change the form of the decay function but does change the initial condition or starting point of the decay function, the initial threshold voltage needs to be known along with parameters describing the time cell's decay function.

There are many ways in which the sensing or reading device can obtain the information that is required for determining an elapsed time. First, the analog time cell and its programming operation may be standardized such that the sensing device can assume that an analog time cell was manufactured with a particular design and programmed in a particular manner for a particular amount of time. In this scenario, the sensing device directly converts an observed threshold voltage value to an elapsed time. The sensing device can be built to convert values without reference to stored parameters that are unique to a particular time cell.

Second, after the analog time cell is initialized, the programming device stores the initialization information into an accessible database, which the sensing device reads to get information that is correlated with its observations. The initialization information might include the amount of time for which the time cell was programmed and a lookup table that correlates programming times to elapsed times for a given type of time call.

Third, rather than expect the sensing device to have such information available, which implies that the programming device and the sensing device are networked in some way, the operational parameters are stored into time cell parameter non-volatile memory 470 by the programming unit during the programming operation. Since the operational parameters are few and require a small amount of inexpensive, non-volatile memory, these parameter values can be stored quite easily. The parameters may include one or more of the following data items: a timestamp consisting of the time at which the programming operation was complete; an identifier of the manufacturer of the time cell; an identifier of the type of time cell; an identifier of an industry standard to which the time cell adheres; a lookup table correlating an observed threshold voltage with a number of units of time (if the sensing circuit is not on the same device as the time cell); a lookup table correlating an observed detection circuit output value with a number of units of time (if the sensing or detection circuit is on the same device as the time cell); and an identifier of the type of time units stored in the parameter memory. Of course, other operational parameters may be stored in association with the time cells. The format of the parameters themselves may adhere to a standard such that different manufacturers of these devices can ensure interoperability.

It should be noted that the concept of employing multiple time cells as an horological device, as explained above for binary time cells, is also applicable to analog time cells. In this embodiment, a set of sensing operations are performed on a set of analog time cells in which each analog time cell in the set has been designed to reduce the threshold voltage of its PCSFET to a predetermined value within a predetermined period of time after it has been programmed. Using an indirect observation of the threshold voltage of each analog time cell, an elapsed time value can be determined for each analog time cell.

Each analog time cell in the set of time cells may possess a unique discharge function from the other time cells in the set. Alternatively, all of the analog time cells in the set of time cells may possess identical discharge functions. It should be noted that it is not necessary for each time cell to be constructed in the same manner, and the discharge functions across a set of time cells may also differ because of varying initial conditions in each time cell. For example, a set of identical analog time cells may be programmed for different lengths of time, thereby providing each of the time cells with a different initial amount of charge and a different ability to measure shorter or longer time periods.

Multiple analog time cells may be employed within a single horological device for a variety of reasons. As one example, the time cells may be viewed as providing a type of redundancy or error-checking in their elapsed time measuring capabilities. The computed elapsed time values from each analog time cell may be statistically combined, e.g., averaged, in order to obtain a final, reported elapsed time value for the horological device. The number of time cells that are used as a redundant set and the number of time cells that are required for a positive determination of an elapsed time may vary.

As another example, each analog time cell may be programmed or initialized by different data processing systems for different purposes at different starting times. A time cell array may monitor different time periods, or different "time sets". The maximum number of time sets would depend on the number of analog time cells in the time cell array and the manner in which the time cells are constructed to measure different time periods. The horological device may also store use indicators that show whether a particular time set is already in use and for storing information that identifies the data processing system that "owns" a particular time set.

Figure 4M:
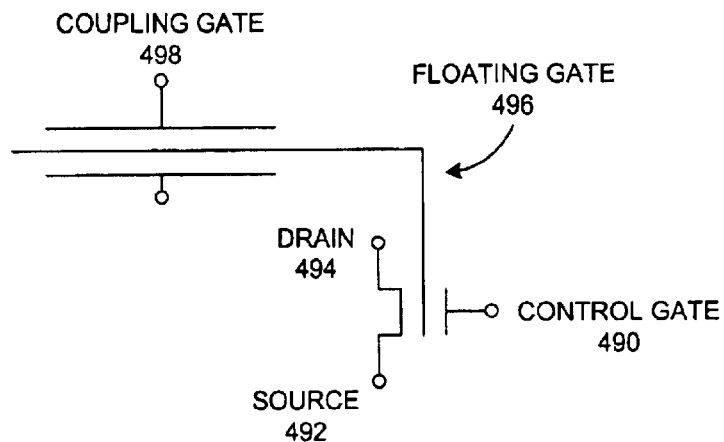
FIGS. 4M–4O are symbolic representations of a different embodiment of a programmable chargeloss-sensing FGFET to be used as an analog time cell.
Figure 4N:
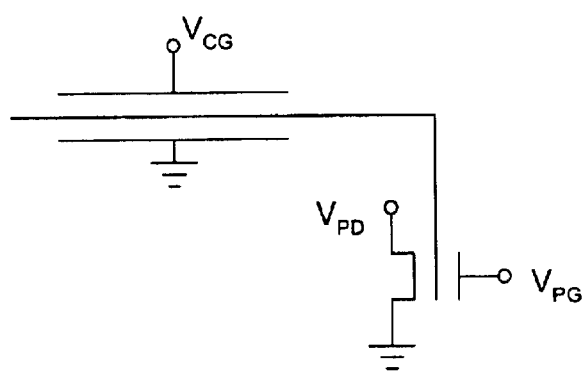
Figure 4O:
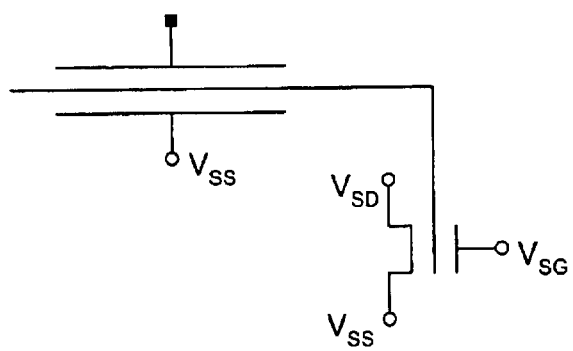

With reference now to FIGS. 4M–4O, symbolic representations are shown of a different embodiment of a programmable chargeloss-sensing FGFET to be used as an analog time cell. In FIG. 4M, a single FGFET has control gate 490, source 492, drain 494, floating gate 496, and coupling gate 498. The PCSFET shown in FIG. 4M is similar to the PCSFET described above with respect to FIGS. 4A–4G except that a single FGFET with a large floating gate replaces both the programming FGFET and the chargeloss-sensing FGFET. FIG. 4N shows voltages $V_{CG}$, $V_{PD}$, and $V_{PG}$ to be applied to PCSFET during a programming process similar to the process described above with respect to FIG. 4C. FIG. 4O shows voltages $V_{SD}$, $V_{SS}$, and $V_{SG}$ to be applied to PCSFET during a chargeloss-sensing process similar to the process described above with respect to FIG. 4D.

Figure 4P:
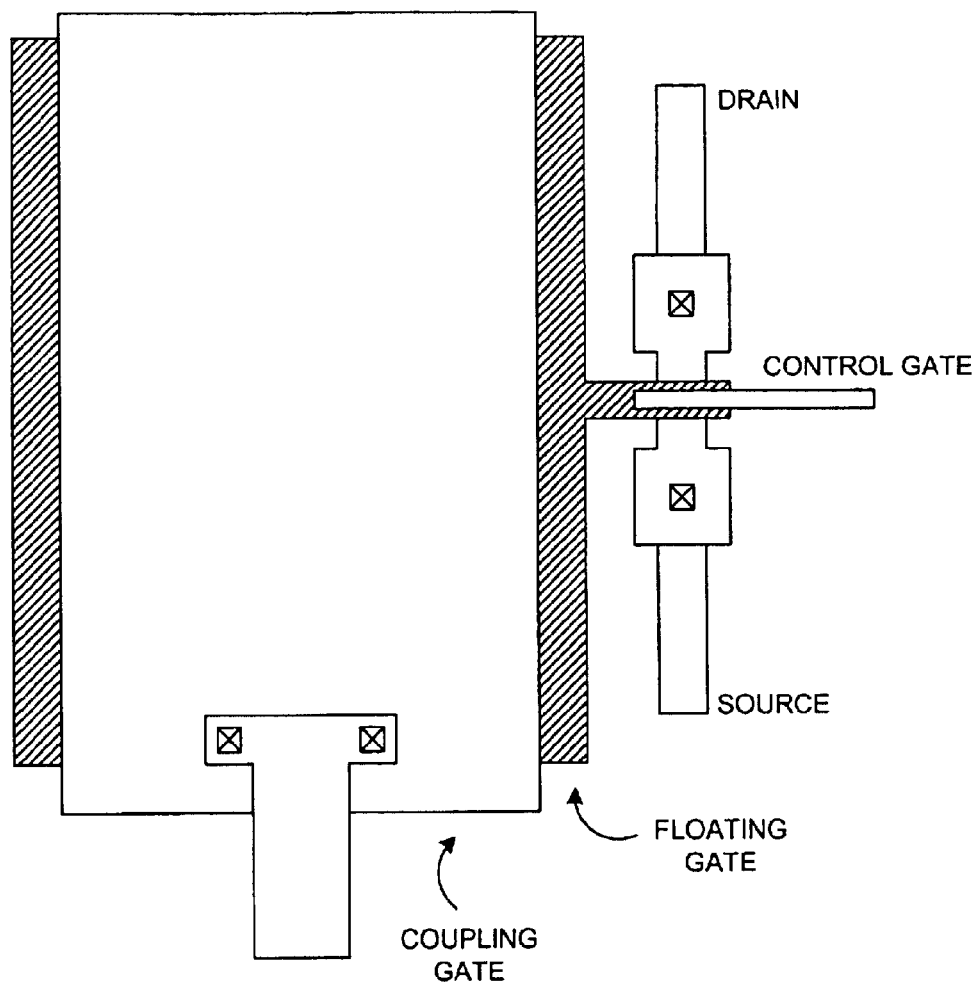
FIG. 4P depicts a physical device comprising a PCSFET with a coupling gate in accordance with an embodiment of the present invention.

With reference now to FIG. 4P, a diagram depicts a physical device comprising a PCSFET with a coupling gate in accordance with an embodiment of the present invention. FIG. 4P shows a top view of a physical PCSFET device similar to that shown in FIGS. 4M–4O. The physical dimensions and operation of the device shown in FIG. 4P is similar to the device shown in FIG. 4E except that a single floating gate transistor performs both the programming and sensing operations that were performed by the programming FGFET and the chargeloss-sensing FGFET shown in FIG. 4E.

The analog time cell shown in FIG. 4P has a disadvantage when compared to the time cell in FIG. 4E in that the programming and sensing processes must be performed through the same transistor. In order to obtain desired speed and efficiency during the programming process, such as CHE injection, the transistor must have particular physical characteristics. In order to obtain desired operational properties during the sensing process, the transistor must have particular physical characteristics. The different physical requirements may be in contention such that it is easier to construct separate transistors with different duties. However, the analog time cell shown in FIG. 4P has the advantage of being smaller and having fewer elements to construct than the analog time cell shown in FIG. 4E.

Conclusion

The advantages of the present invention should be apparent in view of the detailed description of the invention that is provided above. A simple, electronic, horological device acts as an electrostatic hourglass. In general, an insulated, charge storage element is charged, which gives the charge storage element a known electric potential with respect to points outside its insulating medium. Over a period of time, the charge storage element then discharges the electrostatic charge through its insulating medium through some type of physical process, thereby reducing the electric potential of the charge storage element. At a given point in time, the electric potential of the charge storage element is observed, either directly or indirectly. By knowing the beginning electric potential of the charge storage element, the observed electric potential at the given point in time, and the discharge rate of the charge storage element, an elapsed time period can be determined for a given point in time.

The present invention provides electronic time measurement without a continuous energy source, such as a battery or an AC or DC power supply. Moreover, the present invention provides electronic time measurement without an oscillator, an oscillating circuit, a beat or pulse counter, or any other type of electric time base oscillator. The horological device of the present invention also operates without an externally perceivable indicator or display, in which case a human cannot directly observe and interpret an indicator for an elapsed time period as measured by the horological device. However, the horological device is useful for many applications or products in which a display of the timekeeping substance or device is not necessary.

The present invention also has many physical advantages over other types of electronic clocks. Chemical batteries present potential chemical leak and disposal hazards. Batteries tend to have a short shelf life, especially compared to the useful life of the electronic circuits that they accompany. In addition, batteries are sometimes several times larger than the electronic circuit to which they are connected, thereby placing design restrictions on the electronic device. In contrast, the present invention provides a small timekeeping device that is hermetically sealed and essentially impervious to external physical effects except extreme temperatures and extreme radiation. The small size, simple fabrication, and low unit cost provide substantial physical and economic motivations for use in many applications.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. An horological device comprising:

discharging means for discharging a stored electrostatic charge in a charge storage element in a time cell in the horological device using a discharge process with a predetermined discharge rate, wherein the charge storage element comprises an internal medium for storing an electrostatic charge and an insulating medium for insulating the internal medium that substantially surrounds the internal medium, and wherein the time cell transitions from a non-time-measuring state to a time-measuring state in the horological device upon receiving the electrostatic charge; and detection means for detecting a current level of electrical potential at the charge storage element using conductive leads connected to the time cell within an elapsed time period after storing the electrostatic charge.

2. The horological device of claim 1 further comprising:

conversion means for converting the detected level of electrical potential to an elapsed time period value representing an amount of tire since storing the electrostatic charge.

3. The horological device of claim 2 wherein a length of the elapsed time period varies with an initial condition of the horological device after storing an electrostatic charge in the charge storage element.

4. The horological device of claim 3 wherein the initial condition of the horological device is determined by an initial electrical potential of the charge storage element after storing an electrostatic charge in the charge storage element.

5. The horological device of claim 1 further comprising:
a time detection unit for processing a time request to generate a time response after reading the time cell.

6. A method for measuring time with an horological device, the method comprising:
discharging a stored electrostatic charge in a charge storage element in a time cell in the horological device using a discharge process with a predetermined discharge rate, wherein the charge storage element comprises an internal medium for storing an electrostatic charge and an insulating medium for insulating the internal medium that substantially surrounds the internal medium, and wherein the time cell transitions from a non-time-measuring state to a time-measuring state in the horological device upon receiving the electrostatic charge; and
detecting a current level of electrical potential at the charge storage element using conductive leads connected to the time cell within an elapsed time period after storing the electrostatic charge.

7. The method of claim 6 further comprising:
converting the detected level of electrical potential to an elapsed time period value representing an amount of time since storing the electrostatic charge.

8. The method of claim 7 wherein the elapsed time period value is a number of time units representing the elapsed time period.

9. The method of claim 7 wherein the elapsed time period value is a boolean value representing whether or not the elapsed time period value is greater than a specified time period value.

10. The method of claim 6 further comprising:
reading at least one time cell in an array of time cells.

11. The method of claim 10 wherein at least one time cell in the array of time cells has a predetermined discharge rate that differs from a predetermined discharge rate of another time cell in the array of time cells.

12. The method of claim 10 wherein at least two time cells in the array of time cells have substantially identical predetermined discharge rates.

13. The method of claim 10 further comprising:
controlling the array of time cells through a time cell interface unit by reading one or more time cells in the array of time cells.

14. The method of claim 10 further comprising:
processing a time request through a time detection unit to generate a time response after reading one or more time cells within the array of time cells.

15. A computer program product on a computer readable medium for use in a data processing system for measuring time with an horological device, the computer program product comprising:
instructions for receiving a time measurement request for the horological device; and
instructions for detecting a current level of electrical potential at a charge storage element in a time cell in the horological device using conductive leads connected to the time cell within an elapsed time period after storing an electrostatic charge in the charge storage element, wherein the charge storage element comprises an internal medium for storing an electrostatic charge and an insulating medium for insulating the internal medium that substantially surrounds the internal medium, and wherein the time cell transitions from a non-time-measuring state to a time-measuring state in the horological device upon receiving the electrostatic charge, and wherein the stored electrostatic charge discharges from the charge storage element using a discharge process with a predetermined discharge rate.

16. The computer program product of claim 15 further comprising:
instructions for converting a detected level of electrical potential at the charge storage element to an elapsed time period value representing an amount of time since storing the electrostatic charge.

17. The computer program product of claim 16 wherein the elapsed time period value is a number of time units representing the elapsed tire period.

18. The computer program product of claim 16 wherein the elapsed time period value is a boolean value representing whether or not the elapsed time period value is greater than a specified time period value.

19. The computer program product of claim 15 further comprising:
instructions for reading at least one time cell in an array of time cells.

20. The computer program product of claim 19 wherein at least one time cell in the array of time cells has a predetermined discharge rate that differs from a predetermined discharge rate of another time cell in the array of time cells.

21. The computer program product of claim 19 wherein at least two time cells in the array of time cells have substantially identical predetermined discharge rates.

22. The computer program product of claim 19 further comprising:
instructions for controlling the array of time cells through a tine cell interface unit by reading one or more time cells in the array of time cells.

23. The computer program product of claim 19 further comprising:
instructions for processing a time request through a time detection unit to generate a time response after reading one or more time cells within the array of time cells.

24. An horological device comprising:
an internal medium for storing an electrostatic charge;
an insulating medium for insulating the internal medium, the internal medium and the insulating medium forming a charge storage element,
wherein the insulating medium substantially surrounds the internal medium;
wherein the insulating medium has physical properties that allow a charging process for charging the internal medium with an electrostatic charge through the insulating medium;
wherein the insulating medium has physical properties that allow a discharge process for discharging a stored electrostatic charge from the internal medium through the insulating medium;
wherein the insulating medium has one or more physical properties that affect a rate of discharge in the discharge process; and
wherein at least one physical property of the insulating medium has been selected so that the discharge process discharges a stored electrostatic charge at a predetermined discharge rate;
an electrostatic detector physically coupled to the charge storage element for allowing a detection of an electrical potential of the internal medium caused by a retained electrostatic charge in the internal medium; and
a time detection unit for determining an elapsed time period of a programmed charge storage element by operating the electrostatic detector.

25. The horological device of claim 24 further comprising:
- a conversion unit for converting a detected electrical potential of a charge storage element to an elapsed time value after operating the electrostatic detector.

26. The horological device of claim 25 further comprising:
- a request processing unit for processing requests for an elapsed time period.

27. The horological device of claim 25 further comprising:
- a time generating unit for generating a time value in response to a request for determining an elapsed time period.

28. The horological device of claim 24 wherein the charge storage element is a floating gate in a floating gate field effect transistor.

29. A method for measuring time in an horological device, the method comprising:
- discharging a stored electrostatic charge within a charge storage element, wherein the charge storage element comprises an internal medium for storing an electrostatic charge and an insulating medium for insulating the internal medium,
  - wherein the insulating medium substantially surrounds the internal medium:
  - wherein the insulating medium has physical properties that allow a charging process for charging the internal medium with an electrostatic charge through the insulating medium;
  - wherein the insulating medium has physical properties that allow a discharge process for discharging a stored electrostatic charge from the internal medium through the insulating medium;
  - wherein the insulating medium has one or more physical properties that affect a rate of discharge in the discharge process; and
  - wherein at least one physical property of the insulating medium has been selected so that the discharge process discharges a stored electrostatic charge at a predetermined rate; and
- detecting an electrical potential of the internal medium through an electrostatic detector physically coupled to the charge storage element in order to determine an elapsed time since the charge storage element was programmed.

30. The method of claim 29 further comprising:
- converting a detected electrical potential of a charge storage element to an elapsed time value.

31. The method of claim 29 further comprising:
- processing requests to determine an elapsed time period.

32. The method of claim 31 further comprising:
- generating a time value in response to a request for determining an elapsed time period.

33. The method of claim 29 wherein the charge storage element is a floating gate in a floating gate field effect transistor.

34. A method for measuring time comprising:
- discharging a stored electrostatic charge in a floating gate in a first floating gate field effect transistor, wherein the first floating gate field effect transistor comprises a floating gate and an insulating region of insulating material adjacent to the floating gate, wherein the floating gate discharges through a second floating gate field effect transistor, wherein a portion of the floating gate is common to the first floating gate field effect transistor and the second floating gate field effect transistor, wherein a discharge rate of a discharge process that discharges an electrostatic charge stored within the programmed floating gate is inversely related to a thickness of the insulating region, and wherein the thickness of the insulating region is selected such that a threshold voltage of the second floating gate field effect transistor has a predetermined decay rate after programming the floating gate; and
- performing a read operation on the second floating gate field effect transistor to determine its current threshold voltage.

35. The method of claim 34 wherein the predetermined decay rate varies with an initial threshold voltage of the second floating gate field effect transistor after programming the floating gate.

36. The method of claim 34 further comprising:
- converting the detected threshold voltage to an elapsed time period value representing an amount of time since storing the electrostatic charge.

37. A reading device comprising:
- coupling means for coupling, to the reading device, an article of manufacture, wherein the article of manufacture comprises an analog time cell and conductive leads connected to the analog time cell; and
- reading means for reading the article of manufacture.

38. The reading device of claim 37 wherein the analog time cell transitions from a non-time-measuring state to a time-measuring state upon storing an electrostatic charge.

39. The reading device of claim 37 wherein the article of manufacture is a smart card.

40. The reading device of claim 37 further comprising:
- time determining means for determining an elapsed time period since the analog time cell was programmed.

* * * * *

UNITED STATES PATENT AND TRADEMARK OFFICE
CERTIFICATE OF CORRECTION

PATENT NO. : 6,856,581 B1
DATED : February 15, 2005
INVENTOR(S) : Berstis et al.

It is certified that error appears in the above-identified patent and that said Letters Patent is hereby corrected as shown below:

Title page,
Item [57], ABSTRACT, delete and insert therefor

A simple electronic horological device, termed a time cell, is presented with associated methods, systems, and computer program products. A time cell has an insulated, charge storage element that receives an electrostatic charge through its insulating medium, i.e. it is programmed. Over time, the charge storage element then loses the electrostatic charge through its insulating medium. Given the reduction of the electric potential of the programmed charge storage element at a substantially known discharge rate, and by observing the electric potential of the programmed charge storage element at a given point in time, an elapsed time period can be determined. Thus, the time cell is able to measure an elapsed time period without a continuous power source. One type of time cell is a binary time cell that may have a form similar to a non-volatile memory cell. At a given point in time after the binary time cell has been programmed, a read operation allows a binary determination as to whether or not a particular time period has elapsed by observing two possible states of the time cell: the time cell has retained enough charge such that the time cell appears to be a programmed time cell; or the time cell has been discharged during the elapsed time period such that the time cell appears to be a non-programmed time cell. A time cell can be designed and/or programmed to select the particular time period to be measured.

Column 1,
Lines 9-19, delete and insert therefor

The present application is related to the following applications: Application Serial Number 09/703,335, filed 10/31/2000, titled "Batteryless, Oscillatorless, Analog Time Cell Usable as an Horological Device with Associated Programming Methods and Devices"; Application Serial Number 09/703,340, filed 10/31/2000, titled "Sensing Methods and Devices for a Batteryless, Oscillatorless, Binary Time Cell Usable as an Horological Device"; and Application Serial Number 09/703,334, filed 10/31/2000, titled "Sensing Methods and Devices for a Batteryless, Oscillatorless, Analog Time Cell Usable as an Horological Device".

Column 40, line 41 - Column 41, line 26,
Delete claims 1-7 and insert therefor

1. An horological device comprising:
    a time cell, wherein the time cell has a substantially discharged state before a programming operation and has a controlled discharge state after the programming operation, and wherein the time cell transitions after the programming operation from the controlled discharge state to the substantially discharged state within a predetermined time period after the programming operation; and
    a conductive lead connected to the time cell to allow reading a state of the time cell.

2. The horological device of claim 1 wherein a length of the predetermined time period varies with an initial condition of the time cell after the programming operation.

3. The horological device of claim 1 further comprising:
    an array of time cells.

4. The horological device of claim 3 wherein at least one time cell in the array of time cells has a predetermined time period that differs from a predetermined time period of another time cell in the array of time cells.

UNITED STATES PATENT AND TRADEMARK OFFICE
CERTIFICATE OF CORRECTION

| | |
|---|---|
| PATENT NO. | : 6,856,581 B1 |
| DATED | : February 15, 2005 |
| INVENTOR(S) | : Berstis et al. |

It is certified that error appears in the above-identified patent and that said Letters Patent is hereby corrected as shown below:

Column 40, line 41 - Column 41, line 26 (cont'd),

5. The horological device of claim 3 wherein at least two time cells in the array of time cells have substantially identical predetermined time periods.

6. The horological device of claim 3 further comprising:
a time cell interface unit for controlling the array of time cells by initializing one or more time cells in the array of time cells.

7. The horological device of claim 3 further comprising:
a programming request processing unit for processing a programming request to set one or more time cells within the array of time cells.--

Column 41,
Lines 27-42, delete claim 8-12 and insert therefor

8. A method for using an horological device, the method comprising:
programming a time cell, wherein the time cell has a substantially discharged state before a programming operation and has a controlled discharge state after the programming operation; and
discharging the time cell, wherein the time cell transitions after the programming operation from the controlled discharge state to the substantially discharged state within a predetermined time period after the programming operation.

9. The method of claim 8 wherein a length of the predetermined time period varies with an initial condition of the time cell after the programming operation.

10. The method of claim 8 further comprising:
programming at least one time cell in an array of time cells.

11. The method of claim 10 further comprising:
controlling the array of time cells through a time cell interface unit by initializing one or more time cells in the array of time cells.

12. The method of claim 10 further comprising:
processing a programming request to set one or more time cells within the array of time cells.

Column 41, line 44 - Column 42, line 14,
Delete claim 13-17 and insert therefor

13. A computer program product on a computer readable medium for use in a data processing system for using an horological device, the computer program product comprising:
instructions for receiving a programming request to initialize the horological device; and
instructions for programming a time cell, wherein the time cell has a substantially discharged state before a programming operation and has a controlled discharge state after the programming operation, and wherein the memory cell transitions after the programming operation from the controlled discharge state to the substantially discharged state within a predetermined time period after the programming operation.

UNITED STATES PATENT AND TRADEMARK OFFICE
CERTIFICATE OF CORRECTION

PATENT NO. : 6,856,581 B1
DATED : February 15, 2005
INVENTOR(S) : Berstis et al.

It is certified that error appears in the above-identified patent and that said Letters Patent is hereby corrected as shown below:

Column 41, line 44 - Column 42, line 14 (cont'd),

14. The computer program product of claim 13 wherein a length of the predetermined time period varies with an initial condition of the time cell after the programming operation.

15. The computer program product of claim 13 further comprising:
   instructions for programming at least one time cell in an array of time cells.

16. The computer program product of claim 15 further comprising:
   instructions for controlling the array of time cells through a time cell interface unit by initializing or reading one or more time cells in the array of time cells.

17. The computer program product of claim 15 further comprising:
   instructions for processing a programming request to set one or more time cells within the array of time cells.--

Column 42,
Lines 15-25, delete claims 18-20 and insert therefor

18. An horological device comprising:
   a first mode of operation in which a memory cell has a stable memory state before a programming operation;
   a second mode of operation in which the memory cell is programmed to transition from the stable memory state to a non-stable memory state;
   a third mode of operation in which the memory cell has a non-stable memory state after the second mode of operation;
   a fourth mode of operation in which the memory cell transitions from the non-stable memory state to the stable memory state within a predetermined time period; and
   a fifth mode of operation in which the memory cell has a stable memory state after the predetermined time period.

19. The horological device of claim 18 wherein a length of the predetermined time period varies with an initial condition of the memory cell after the second mode of operation.

20. An horological device comprising:
   maintaining means for maintaining a non-time-measuring state in the horological device without inputting energy into the horological device;
   changing means for changing from the non-time-measuring state to a time-measuring state by receiving and storing an electrostatic charge in a charge storage element within the horological device, wherein the charge storage element comprises an internal medium for storing an electrostatic charge and an insulating medium for insulating the internal medium that substantially surrounds the internal medium; and
   transitioning means for transitioning from the time-measuring state to the non-time-measuring state, without inputting energy into the horological device, by discharging the stored electrostatic charge in the charge storage element to a predetermined level of electrical potential within a predetermined time period after changing to the time-measuring state.--

UNITED STATES PATENT AND TRADEMARK OFFICE
CERTIFICATE OF CORRECTION

PATENT NO. : 6,856,581 B1
DATED : February 15, 2005
INVENTOR(S) : Berstis et al.

It is certified that error appears in the above-identified patent and that said Letters Patent is hereby corrected as shown below:

Column 42,
Lines 26-33, delete claims 21-22 and insert therefor

21. A method for using an horological device, the method comprising:
   maintaining a non-time-measuring state in the horological device without inputting energy into the horological device;
   changing from the non-time-measuring state to a time-measuring state by receiving and storing an electrostatic charge in a charge storage element within the horological device, wherein the charge storage element comprises an internal medium for storing an electrostatic charge and an insulating medium for insulating the internal medium that substantially surrounds the internal medium;
   transitioning from the time-measuring state to the non-time-measuring state, without inputting energy into the horological device, by discharging the stored electrostatic charge in the charge storage element to a predetermined level of electrical potential within a predetermined time period after changing to the time-measuring state; and
   detecting a current state of the charge storage element to determine an elapsed time.

22. An horological device comprising:
   an internal medium for storing an electrostatic charge;
   an insulating medium for insulating the internal medium, the internal medium and the insulating medium forming a charge storage element,
      wherein the insulating medium substantially surrounds the internal medium;
      wherein the insulating medium has physical properties that allow a charging process for charging the internal medium with an electrostatic charge through the insulating medium;
      wherein the insulating medium has physical properties that allow a discharge process for discharging a stored electrostatic charge from the internal medium through the insulating medium;
      wherein the insulating medium has one or more physical properties that affect a rate of discharge in the discharge process; and
      wherein at least one physical property of the insulating medium has been selected so that the discharge process discharges a stored electrostatic charge at a predetermined discharge rate.--

Column 42, line 34 - Column 43, line 48,

23. The horological device of claim 22 wherein the predetermined discharge rate is non-linear with respect to time.

24. The horological device of claim 22 wherein the discharge process is Fowler-Nordheim tunneling.

25. The horological device of claim 22 wherein the charging process is channel hot electron injection.

26. The horological device of claim 22 further comprising:
   a charge injector for injecting charge through the insulating medium into the internal medium.

27. The horological device of claim 26 further comprising:
   a programming unit for programming the charge storage element by operating the charge injector.

28. The horological device of claim 27 further comprising:
   a request processing unit for processing requests to program the charge storage element.

UNITED STATES PATENT AND TRADEMARK OFFICE
CERTIFICATE OF CORRECTION

| | |
|---|---|
| PATENT NO. | : 6,856,581 B1 |
| DATED | : February 15, 2005 |
| INVENTOR(S) | : Berstis et al. |

It is certified that error appears in the above-identified patent and that said Letters Patent is hereby corrected as shown below:

Column 42, line 34 - Column 43, line 48 (cont'd),

29. The horological device of claim 27 further comprising:
a status generating unit for generating status from programming the charge storage element.

30. The horological device of claim 22 wherein the charge storage element is a floating gate in a floating gate field effect transistor.--

Column 43, line 51 - Column 44, line 32,
Delete claims 31-38 and insert therefor 31. A method for using an horological device, the method comprising:
programming a charge storage element by storing an electrostatic charge within the charge storage element, wherein the charge storage element comprises an internal medium for storing an electrostatic charge and an insulating medium for insulating the internal medium,
wherein the insulating medium substantially surrounds the internal medium;
wherein the insulating medium has physical properties that allow a charging process for charging the internal medium with an electrostatic charge through the insulating medium;
wherein the insulating medium has physical properties that allow a discharge process for discharging a stored electrostatic charge from the internal medium through the insulating medium;
wherein the insulating medium has one or more physical properties that affect a rate of discharge in the discharge process; and
wherein at least one physical property of the insulating medium has been selected so that the discharge process discharges a stored electrostatic charge at a predetermined rate; and
discharging the stored electrostatic charge from the charge storage element.

32. The method of claim 31 further comprising:
programming the charge storage element by injecting charge through the insulating medium into the internal medium.

33. The method of claim 31 further comprising:
processing requests to program the charge storage element.

34. The method of claim 31 further comprising:
generating status after attempting to program the charge storage element.

35. The method of claim 31 wherein the charge storage element is a floating gate in a floating gate field effect transistor.--

UNITED STATES PATENT AND TRADEMARK OFFICE
CERTIFICATE OF CORRECTION

PATENT NO. : 6,856,581 B1
DATED : February 15, 2005
INVENTOR(S) : Berstis et al.

It is certified that error appears in the above-identified patent and that said Letters Patent is hereby corrected as shown below:

<u>Column 44,</u>
Lines 33-51, delete claims 36-40 and insert therefor

36. An article of manufacture comprising:
   a binary time cell; and
   a conductive lead for allowing a state of the binary time cell to be modified or read.

37. The article of manufacture of claim 36 wherein the binary time cell has a substantially discharged state before a programming operation and has a controlled discharge state after the programming operation, and wherein the binary time cell transitions after the programming operation from the controlled discharge state to the substantially discharged state within a predetermined time period after the programming operation.

38. The article of manufacture of claim 36 wherein the article of manufacture is a smart card.

39. The article of manufacture of claim 36 further comprising:
   coupling means for coupling the article of manufacture to a reading device or programming device.

40. The article of manufacture of claim 36 further comprising:
   time determining means for determining whether or not a predetermined time period has elapsed since the binary time cell was programmed.--

Signed and Sealed this

Eighteenth Day of October, 2005

JON W. DUDAS
*Director of the United States Patent and Trademark Office*